United States Patent
Matiash et al.

(10) Patent No.: US 10,257,291 B1
(45) Date of Patent: Apr. 9, 2019

(54) EVENT-BASED CONTENT SHARING USING GEOFENCING

(71) Applicant: Google Inc., Mountain View, CA (US)

(72) Inventors: Brian Matiash, Sunnyvale, CA (US); Nicholas Butko, Mountain View, CA (US); David M. Cohen, Mountain View, CA (US); Emily Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 158 days.

(21) Appl. No.: 14/299,862

(22) Filed: Jun. 9, 2014

(51) Int. Cl.
*G06F 15/16* (2006.01)
*H04L 29/08* (2006.01)

(52) U.S. Cl.
CPC .................. *H04L 67/18* (2013.01)

(58) Field of Classification Search
CPC ....... H04L 67/18; H04L 67/306; H04W 4/028
USPC ......................................................... 709/204
See application file for complete search history.

(56) References Cited

U.S. PATENT DOCUMENTS

| | | | |
|---|---|---|---|
| 8,599,801 B2 | 12/2013 | Baio et al. | |
| 8,965,988 B1* | 2/2015 | Negahban | H04W 4/22 709/206 |
| 2005/0216583 A1* | 9/2005 | Cole | G06Q 20/3224 709/224 |
| 2011/0066690 A1* | 3/2011 | Ellanti | G06Q 10/107 709/206 |
| 2012/0284638 A1 | 11/2012 | Cutler et al. | |
| 2013/0054422 A1* | 2/2013 | DeSouza | G06Q 30/00 705/27.1 |
| 2013/0132477 A1 | 5/2013 | Bosworth et al. | |
| 2013/0159463 A1* | 6/2013 | Bentley | H04L 67/10 709/217 |
| 2013/0252638 A1* | 9/2013 | Yang | H04W 4/021 455/456.3 |
| 2013/0286223 A1 | 10/2013 | Latta et al. | |
| 2013/0339358 A1 | 12/2013 | Huibers et al. | |
| 2014/0282192 A1* | 9/2014 | Grossman | G06F 3/0484 715/771 |
| 2014/0351328 A1* | 11/2014 | Woods | H04W 4/021 709/204 |
| 2015/0120455 A1* | 4/2015 | McDevitt | G06Q 30/0261 705/14.58 |
| 2015/0172330 A1* | 6/2015 | Kaplan | H04L 65/403 709/206 |
| 2015/0350351 A1* | 12/2015 | Tung | H04L 67/18 709/204 |

* cited by examiner

*Primary Examiner* — Suraj M Joshi
*Assistant Examiner* — Jaren Means
(74) *Attorney, Agent, or Firm* — Patent Law Works LLP

(57) ABSTRACT

Various embodiments for event-based information sharing are disclosed. In one example embodiment, an event definition describing an event is determined. An event geofence associated with a location of the event is generated and content is shared between invitees attending the event and located within an area of the event geofence.

21 Claims, 10 Drawing Sheets

EVENT-BASED CONTENT SHARING USING GEOFENCING

BACKGROUND

The present disclosure relates to electronic communication. In particular, the present disclosure relates to event-based content sharing using geofencing.

Using some current solutions, it can be challenging to share content (e.g., location, photos, text, etc.) securely between private groups of people at an event who have a shared investment in accessing that content. This problem is particularly prominent when the people are on the go and are taking part of a shared event. For instance, an event may take place at a specific location and at a specific time, such as a party in downtown San Francisco. Using these solutions, there is no integrated way to determine the location of those who have confirmed that they will be attending. This can cause a problem for those who are running late or are lost because they might not be able to locate where the group is, especially if the event is a roaming event. Or conversely, it can be difficult for the event coordinator to gauge how far a specific person is from the event location without having to call that person.

SUMMARY

According to one innovative aspect of the subject matter described in this disclosure, a system includes one or more processors and one or more memories storing instructions that, when executed by the one or more processors, cause the system to perform operations including determining an event definition describing an event; generating an event geofence associated with a location of the event; and sharing content between invitees attending the event and located within an area of the event geofence.

In general, another innovative aspect of the subject matter described in this disclosure may be embodied in methods that determining, using one or more computing devices, an event definition describing an event; generating an event geofence, using the one or more computing devices, associated with a location of the event; and sharing, using the one or more computing devices, content between invitees attending the event and located within an area of the event geofence.

Other embodiments of one or more of these aspects include corresponding systems, apparatus, and computer programs, configured to perform the actions of the methods, encoded on computer storage devices.

These and other implementations may each optionally include one or more of the following features, such as that determining the event definition includes receiving the event definition from a client device of an event stakeholder, the event definition including the location for the event, a duration for the event, and the invitees; that generating the event geofence includes initializing the event geofence to persist for a duration corresponding to the duration of the event; that sharing content between the invitees attending the event includes verifying that the invitees are within the area of the geofence; receiving, using the one or more computing devices, a request from an invitee included in the event definition that has not yet arrived to the event; determining, using the one or more computing devices, that a client device of the invitee is approaching the area of the geofence; providing, using the one or more computing devices, access to the invitee to share content with other invitees attending the event and located within the area of the geofence responsive to determining that the client device of the invitee is approaching the area of the geofence; creating, using the one or more computing devices, a sub-geofence from the geofence for a sub-group of the invitees in attendance of the event that have moved to a location distinct from a location of the event covered by the area of the geofence; receiving, using the or more computing devices, a content share request from an invitee; determining, using the one or more computing devices, that a client device of the invitee is within an area of the sub-geofence created from the event geofence; determining, using the one or more computing devices, an access level for the content share request; providing, using the one or more computing devices, access to the invitee to share content with other invitees associated with the sub-geofence or the event geofence based on the access level; determining, using the one or more computing devices, the invitees associated with the geofence are migrating to a new location different from the location defined in the event; and dynamically updating, using the one or more computing devices, the area of the geofence to include the new location.

It should be understood, however, that this list of features is provided by way of example and is not all-inclusive, as many additional features fall within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein enables an event attendee within a geofence to automatically share content with other event attendees within the geofence. An event is generally associated with a physical gathering of some sort, often for a particular purpose, and a user can plan the event using an event planning application included in the technology, for example, by inputting an event definition into a corresponding application interface. In some embodiments, the event may persist for a specific duration and the technology may enable and disable sharing based upon entry into and exit from a geofence associated with the event, although other variations are contemplated where the duration of an event may be open-ended or dynamic, as discussed in further detail elsewhere herein.

A geofence may cover one or more geographic locations associated with the event. In some embodiments, the geofence area may be defined by a set of geographic coordinates that establish a perimeter. The perimeter may include a single or multiple continuous and/or discontinuous geographic locations. In some embodiments, the geofence can be fixed to one or more specific locations or may be dynamic/mobile and move with a group of users associated with the event (e.g., inferred by the location data received from the participant-users' mobile devices).

The geofence may be used by a social network application to share content. The scope of the sharing by the social network application may be limited to the users associated with the event, such as the event invitees, those attending the event, those meeting an exemption requirement, etc. In some embodiments, the social network application can privately share content associated with the event based on whether or not the attendees are located within the geofence and/or meet an exemption requirement.

An event definition defining an event includes parameters that set forth the details for the event. In some embodiments, the event parameters include one or more of the event invitees, the start time and/or duration of the event, the event location(s), an event description, an event title, keywords and/or tags characterizing the event, an event theme, content sharing, etc. The event invitees parameter may specify a list of specific users, may allow invitees to invite friends, may be open to any users or users that meet certain criteria (e.g., work at a particular company, attended a particular school, etc.), etc. The content sharing parameter(s) may determine if, when, how, and what type of content may be shared. For example, the content sharing parameter(s) may specify the type of content that can be shared, specify the scope of the sharing, specify the duration of the sharing, specify which of the attendees can access the shared content, specify whether post-event sharing and/or viewing is allowed, etc.

Figure 1:
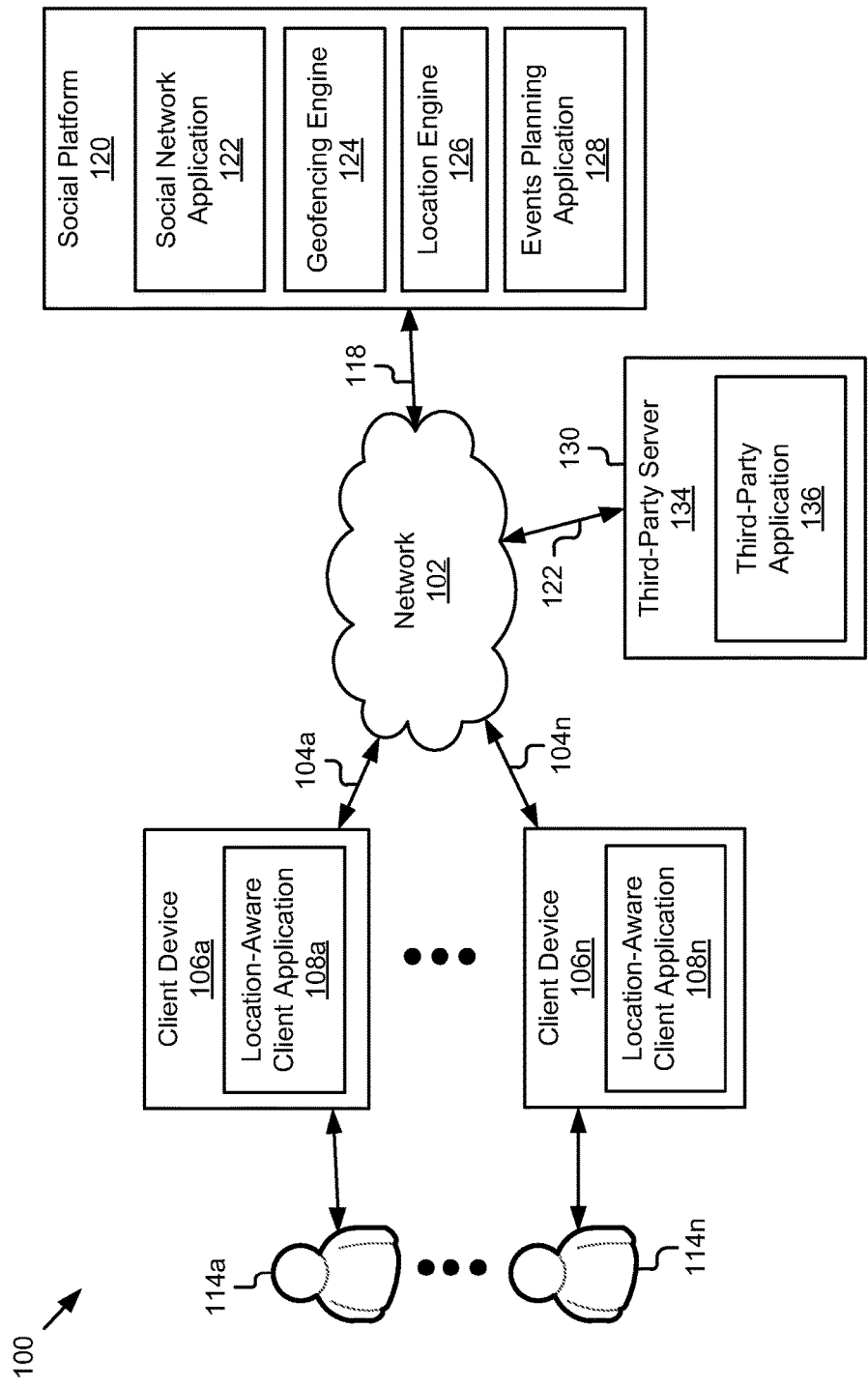
FIG. 1 is a block diagram illustrating an example system for event-based content sharing using geofencing.

FIG. 1 is a block diagram illustrating an example system 100 for providing event-based content sharing using geofencing. The illustrated system 100 includes a network 102 that electronically communicatively couples a social platform 120, a third-party server 134, and one or more client devices 106*a* . . . 106*n* (also referred to herein individually and collectively as 106) that are accessible by users 114*a* . . . 114*n* (also referred to herein individually and collectively as 114).

The network 102 may include one or more wired or wireless networks having any number of network configurations. The network 102 may include any interconnected data path across which multiple devices may communicate including, for example, a local area network (LAN), a wide area network (WAN) (e.g., the Internet), a wireless wide area network (WWAN), a virtual private network (VPN), various telecommunications networks, direct data connections, etc. In some embodiments, the network 102 may include device-to-device communication networks (e.g., Bluetooth®), peer-to-peer (P2P) networks, etc., for sending and receiving data between devices. The network 102 may transmit data using a variety of different communication protocols including, for example, user datagram protocols (UDP), transmission control protocols (TCP), hypertext transfer protocol (HTTP), hypertext transfer protocol secure (HTTPS), file transfer protocol (FTP), various cellular protocols, various messaging (e.g., email) protocols, etc. Computing devices (e.g., 106, 120, 134, etc.) may couple to and communicate via the network 102 using wireless and/or wired connections.

In the depicted embodiment, the social platform 120 is coupled to the network 102 via signal line 118, and interacts with the other entities 106 and 134 of the system 100 via the network 102. In some embodiments, the social platform 120 includes one or more computing devices and one or more storage devices storing data or instructions for execution by the one or more computing devices. For example, the social platform 120 may include a physical or virtual server, a server array or any other computing device, or group of physical or virtual computing devices, having data processing, storing and communication capabilities. In some embodiments, the social platform 120 may include a virtual server (e.g., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). In these or other embodiments, the social platform 120 may be implemented using a cloud-based architecture, with its software components operating as a service on one or more servers distributed through the network 102. It should be understood that the social platform 120 can be stored in any combination of devices and servers, singular or plural. Although only one social platform 120 is shown, multiple social platforms 120 may be included in the system 100.

As depicted, the social platform 120 may include a social network application 122, a geofencing engine 124, a location engine 126, and an events planning application 128, although other configurations are also possible, such as where the social network application 122, the geofencing engine 124, the location engine 126, and the events planning application 128 are integrated or divided into additional components, or hosted in separate environments (e.g., on a third-party server 134) etc. For instance, in some embodiments, various acts and/or functionality of the social network application 122, geofencing engine 124, the location engine 126, and events planning engine 128 may be performed client-side by the location-aware client application 108 and/or by a one or more third-party applications 136, and/or various acts and/or functionality of the location-aware client application 108 may be shifted server-side and performed by various components of the social platform 120 and/or the third-party server 134.

In some embodiments, the social network application 122, the geofencing engine 124, the location engine 126, and the events planning application 128 may be operable by the one or more computing devices of the social platform 120. In some embodiments, one or more of the social network application 122, the geofencing engine 124, the location engine 126, and the events planning application 128 may be operable on one or more disparate computing devices coupled to the network 102. For example, the social network application 122 may be operable on the social platform 120 and the geofencing engine 124, the location engine 126, and the events planning application 128 may be operable on one or more instances of a third-party server 134 in addition to, in the place of, or supplemental to one or more of them being included in the social platform 120.

The social network application 122 includes software and/or hardware for providing a virtual social network (social network) that allows users to interact and exchange information. The geofencing engine 124 includes software and/or hardware for creating, managing, and dissolving geofences. The location engine 124 includes software and/or hardware for receiving and interpreting location data from users of the social network application 122 and/or the events planning application 128. The events planning application 128 includes software and/or hardware for planning and managing events. The social network application 122, the geofencing engine 124, the location engine 126, and the events planning application 128 are discussed in further detail below.

The client devices 106a . . . 106n are computing devices having data processing and data communication capabilities. In the illustrated embodiment, the client devices 106a . . . 106n are coupled to the network 102 via signal lines 104a and 104n, respectively, for cooperation and communication with the other entities of the system 100. While FIG. 1 illustrates two or more client devices, in practice the present disclosure applies to any system architecture having any number of client devices. For example, the social platform 120 may have millions of users that connect to and use the virtual social network-related services provided by the social platform 120.

In some embodiments, the client device 106 may include a processor, a memory, a power source and one or more network interfaces to broadcast and receive network data, voice data, and/or control data, etc., via wired and/or wireless signals. The client device 106 may also include one or more of a graphics processor; a high-resolution touchscreen; a physical keyboard; forward and rear facing cameras; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resources of the client device 106, application programming interfaces (APIs) for providing applications access to the hardware and resources, a user interface engine for generating and displaying interfaces for user interaction and input, and applications such as applications for planning events, social networking, making phone calls, video calls, web browsing, messaging, gaming, capturing digital video and/or images, etc., may be stored and operable on the client device 106.

In some embodiments, a client device 106 is a computing device such as a workstation computer, a desktop computer, a laptop computer, a netbook computer, a tablet computer, a smartphone, a set-top box/unit, a television with one or more processors embedded therein or coupled thereto, a server, or the like. In some embodiments, different client devices 106a . . . 106n comprise different types of computing devices. For example, the client devices 106a . . . 106n may include a smartphone, a tablet computer, a laptop, a server, etc. In some embodiments, the client device 106 is a client or terminal device.

As depicted, the client devices 106a . . . 106n include instances 108a . . . 108n of a location-aware client application (also referred to herein individually and/or collectively as 108). The location-aware client application 108 is operable by a client device 106 to render user interfaces, receive user input, capture image data, and send information to and receive information from the social network application 122, the geofencing engine 124, the location engine 126, and the events planning application 128. While in the depicted embodiment, the client devices 106a . . . 106n each include an instance of the location-aware client application 108, any number of client devices 106 may include an instance the location-aware client application 108. Additional structure, acts, and functionality of the location-aware client application 108 (or client application 108) are discussed in further detail below.

The third-party server 134 includes one or more computing devices hosting a network-based software application operable to provide various services, acts, and/or functionalities, and to send data to and receive data from the social platform 120, the client devices 106a . . . 106n, and any other entity or entities coupled to the network 102 via the network 102. The third-party server 134 is coupled to the network 102 via signal line 122. In some embodiments, the third-party server 134 includes a physical or virtual server, a server array, and/or any other computing device, or group of computing devices, having data processing, storing and communication capabilities.

In some embodiments, the third-party server 134 may include a third-party application 136 that may be configured to provide one or more services including identity authentication (e.g., as a federated identity server); geofencing; device positioning and/or location; event planning; internet searching; social networking; web-based email; blogging; micro-blogging; photo management; video, music and multimedia hosting, distribution, and sharing; business services; news and media distribution; or any combination of the foregoing services. It should be understood that the third-party server 134 including the third-party application 136 is not limited to providing the above-noted services and may include other services, such as any other network-based or cloud-based services. For simplicity, a single block for the third-party server 134 is shown in FIG. 1. However, it should be understood that any number of distinct third party servers (not shown) may be coupled to the network via distinct signal lines to provide distinct and/or competing services.

Figure 2:
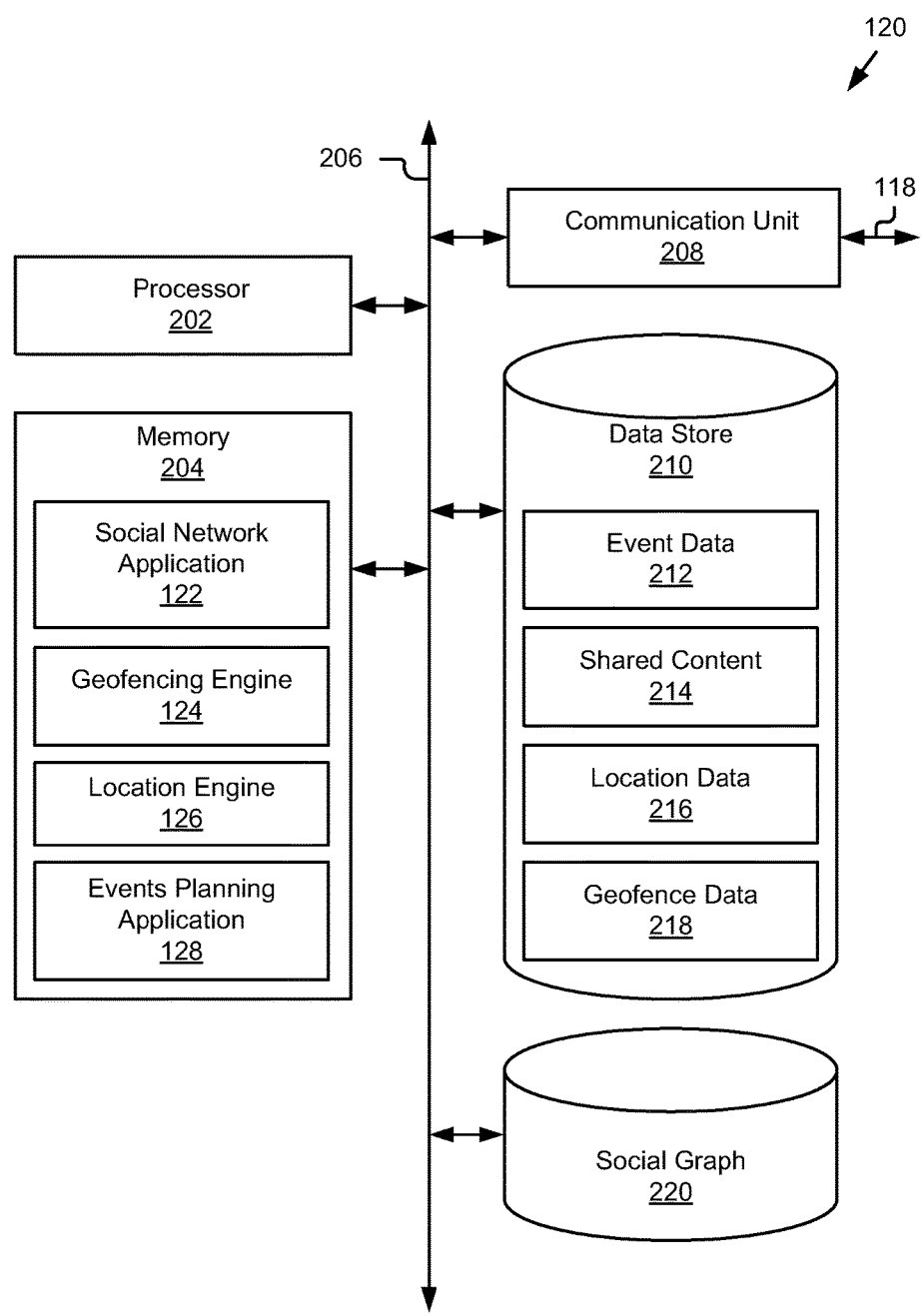
FIG. 2 is a block diagram of an example social platform.
Figure 3:
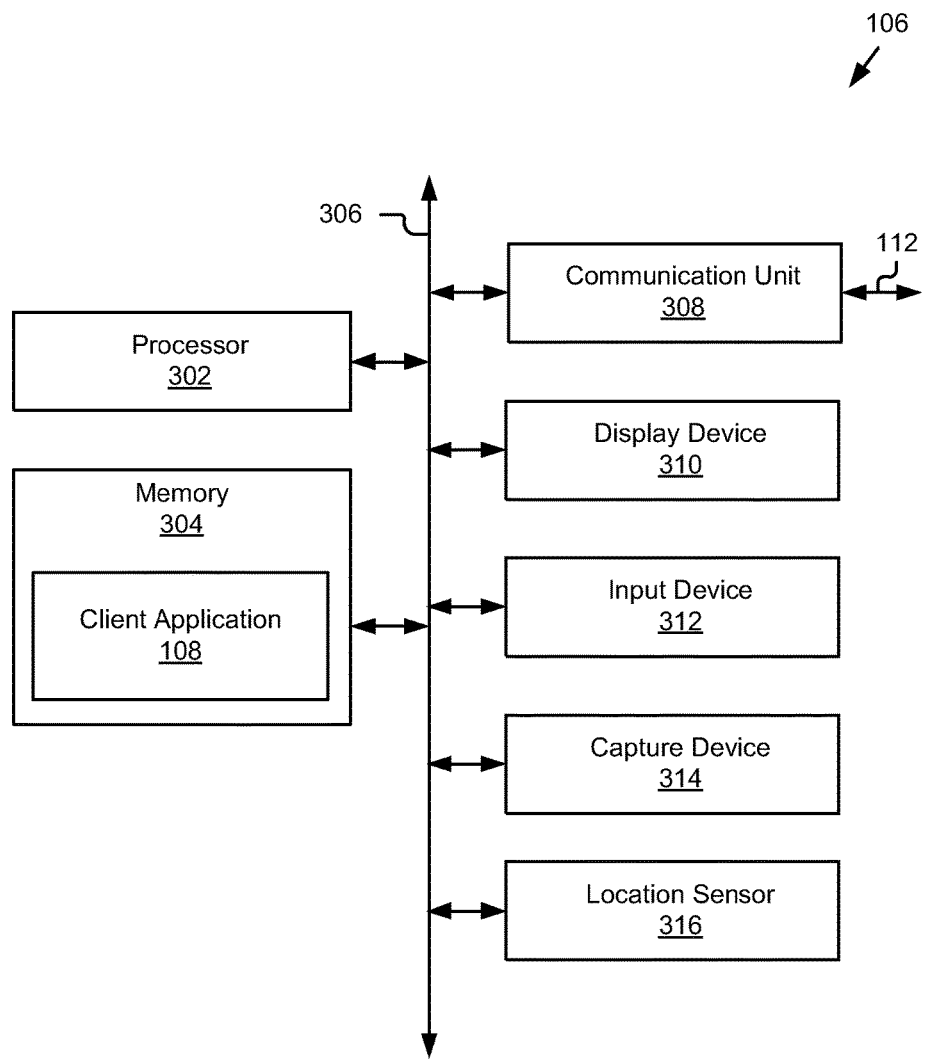
FIG. 3 is a block diagram of an example client device.

FIGS. 2 and 3 depict example computing architectures. In particular, FIG. 2 is a block diagram of an example social platform 120 and FIG. 3 is a block diagram of an example client device 106. The social platform 120 includes one or more computing devices comprising a processor 202, a memory 204 storing one or more of the social network application 122, the geofencing engine 124, the location engine 126, and the events planning application 128, a communication unit 208, a data store 210, and a social graph 220. The components 202, 204, 208, 210, and 220 may be communicatively coupled via a communication bus 206. The client device 106 includes a processor 202, a memory 204 storing the location-aware client application 108, a communication unit 208, an output device 320, an input device 312, a capture device 314, and a location sensor 316. The components 202, 204, 208, 310, 312, 314, and 316 may be communicatively coupled via a communications bus 206.

The bus 206 can include a conventional communication bus for transferring data between components of a computing device or between computing devices, a network bus system including the network 102 or portions thereof, a processor mesh, a combination thereof, etc. In some embodiments, the bus 206 may include a software communication mechanism that may include and/or facilitate, for example, inter-process communication, local function or procedure calls, remote procedure calls, an object bus (e.g., CORBA), direct socket communication (e.g., TCP/IP sockets), UDP broadcasts and receipts, HTTP connections, etc., among software modules and/or engines. The software communication can be implemented on any underlying hardware, such as a network, the Internet, the bus 206, a combination thereof, etc. Further, any or all of the communication could be secure (e.g., SSH, HTTPS, etc.). It should be understood that the specific bus architecture and configuration used by the social platform 120 and the client device 108 could vary.

The processor 202 comprises an arithmetic logic unit, a microprocessor, a general purpose controller, or some other processor array to perform computations and provide electronic display signals to a display device (not shown). The processor 202 is coupled to the bus 206 for communication with the other components of the computing device(s). Processor 202 processes data signals and may comprise various single or multi-core computing architectures including a complex instruction set computer (CISC) architecture, a reduced instruction set computer (RISC) architecture, or an architecture implementing a combination of instruction sets. The processor 202 may be representative of a single processor or multiple processors and is capable of supporting the display of images and the capture and transmission of images, perform complex tasks, including various types of feature extraction and sampling, etc. It should be understood that the specific processor architecture and configuration used by the social platform 120 and the client device 108 could vary.

The memory 204 includes a non-transitory computer-usable (e.g., readable, writeable, etc.) medium, which can be any tangible apparatus or device that can contain, store, communicate, propagate or transport software instructions (e.g., the depicted modules, engines, etc.) and data, etc., for processing and/or execution by or in connection with the processor 202.

In some embodiments, the memory 204 may include volatile memory, non-volatile memory, or both. For example, the memory 204 may include one or more of a dynamic random access memory (DRAM) device, a static random access memory (SRAM) device, flash memory, a hard disk drive, a floppy disk drive, an optical (e.g., CD, DVD, Blue-ray, etc.) memory device, and any other available memory device. It should be understood that the memory 204 may represent a single device or multiple devices of the same or different type and/or configuration. It should be understood that the specific memory architecture and configuration used by the social platform 120 and the client device 108 could vary.

While in the depicted embodiments in FIGS. 2 and 3 show the components 108, 122, 123, 126, 128, and 108 as executable instructions (e.g., software) stored in memory, it should be understood that some or all of these components may, in some embodiments, be implemented via one or more application specific integrated circuits (ASICs) coupled to the bus 206 for cooperation and communication with the other components of the social platform 120 or the client device 108, as the case may be; sets of instructions stored in one or more discrete memory devices (e.g., a PROM, FPROM, ROM) that are coupled to the bus 206 for cooperation and communication with the other components of the social platform 120 or the client device 108, as the case may be; a combination thereof; etc.

In the embodiment depicted in FIG. 2, the memory 204 may store at least the social network application 122, the geofencing engine 124, the location engine 126, and the events planning application 128. In the embodiment depicted in FIG. 3, the memory 204 may store at least the client application 108. Further, it should be understood that the memory 204 is also capable of storing other instructions and data, including, for example, an operating system, hardware drivers, other software applications, databases, etc. The memory 204 is coupled to the bus 206 for communication with the processor 202 and the other components of social platform 120 or the client device 106, as the case may be. The instructions and/or data may comprise software for performing any and/or all of the acts and/or functionality described herein.

The communication unit 208 may include devices for communicating with other electronic devices. For example, the communication unit 208 may include wireless network transceivers (e.g., Wi-Fi™, Bluetooth®, cellular), wired network interfaces (e.g., a CAT-type interface), USB, FireWire, Thunderbolt, or other available interfaces. The communication unit 208 may provide connections to the network 102 and to other entities of the system 100 using standard communication protocols including, for example, those discussed with reference to the network 102. The communication unit 208 may link the processor 202 to the network 102, which may in turn be coupled to other processing systems. Depending on the embodiment, the communication unit 208 may be coupled to the network 102 via signal line 118 or 112 for communication and interaction with the other entities of the system 100.

The social network application 122, the geofencing engine 124, the location engine 126, and the events planning application 128. In some embodiments, one or more of the components 122, 124, 126, and/or 128 include sets of instructions executable by the processor 202. In some embodiments, one or more of the components 122, 124, 126, and/or 128 are stored in the memory 204 and are accessible and executable by the processor 202. In any of the foregoing embodiments, these components 122, 124, 126, and/or 128 may be adapted for cooperation and communication with the processor 202 and other components of the system 100.

The social network application 122 is software including routines for providing a virtual social network via which users may share content and communicate. The social network is a social structure that connects users by one or more common features. The common features can include any attribute, interest, preference, relation, or interaction attributable to the users. For example, the common features include relationships/connections, e.g., professional and academic attributes and interests, friendships, familial ties, etc. The common features can also include explicitly-defined relationships and relationships implied by social connections with other online users and entities. The common features can be provided by one or more social networking systems, including, for example, the social network application 122. These common features, which may be stored as profile information for the users, can be mapped by the social network application 122 to connect the users.

A user's social graph may include social graph connection information describing connections between that user and the other users of the social network; what common features (e.g., attributes, interests, social network activity, relationships, etc.) connect that user to other users; any groups/sets formed by that user and/or the social network application 122 to categorize or group his or her connections on the social network; the strength of the connections (e.g., affinity) between the user and other users, which can be calculated based on, for example, the degree or degrees (e.g., 1st, 2nd, 3rd, 4th, etc.) of separation between the user and other users, who, if any, the connecting/interstitial users are; the amount or type of interactions between the users, etc.; etc. For instance, the social network application 122 and/or a user (e.g., via an associated user interface), may define groups for users who are work friends, school friends, networking contacts, clients, etc., and social graphs may include data reflecting what groups these users belong to. Together, the social graphs of the users form a collective social graph 220 that reflects a mapping of all of the users of the social network and how they are related.

In some embodiments, the information stored by the social graph 220 may be stored in the memory 204 or a data store of the application server 118, or may be included in a memory, computing device and/or storage system distinct from but accessible by the application server 118. In various embodiments, the social graph 220 stores records, files, objects, data, etc., in cooperation with a file system executable by the processor 202. The social graph 220 may additionally or alternatively include a database management system (DBMS) executable by the processor 202 to manage a collection of records, files, objects, etc. For example, the database could be a structured query language (SQL), NoSQL DBMS, etc., storing data that can be manipulated using programmatic operations (e.g., queries and statements) by the social network application 122, the geofencing engine 123, the location engine 126, the events planning application 128, and the other entities of the system 100.

Users may use the social network to receive and share content with other users. In a simple example, a user may input content (e.g., a status, photos, videos, a URL, a location check-in, other content) into a form presented by the client application 108 or another application and submit it to the social network application 122. The social network application may receive the user's submission and inject it into the content streams of that user's connections on the social network.

The social network application 122 may notify invitees of events planned using the events planning application 128 (e.g., via a notification tool provided by the social network application 122, via a post injected into the user's content stream, etc.). In some embodiments, the social network application 122 may collaborate with the events planning application 128 to provide users with a socially-enabled events planning experience. For example, the social network application 122 may provide data, such as social graph data and content data, to or store data for retrieval by, the events planning application 128.

The social network application 122 may receive content shared by users and associate that content with an event planned using the events planning application 128. In some embodiments, the social network application 122 may associate the content with the event in the data store 210. For instance, the social network data may store the content as shared content data 214 in the data store and relate (e.g., link) that content with the event, which is stored as event data 212.

The social network application 122 may receive, in some cases, event-related content that was captured during the event or is otherwise somehow associated with the event after the event has ended, and may add the content to the event (e.g., by associating it with the event in the data store 210) to provide a more complete picture of the event and allow attendees and/or invitees to reminisce and/or catch up on the various proceedings at the event. In some embodiments, the social network application 122 may automatically add content to an event or may request authorization from a stakeholder of the event (e.g., the event planner or a delegate thereof).

The social network application 122 may interact with the geofencing engine 124 and the location engine 122 to receive location-related data, which it can use to associate shared content with the appropriate event, as discussed further elsewhere herein. The social network application 122 may be coupled to the geofencing engine 124, the location engine 126, and/or the events planning engine 128 to send and receive data, and may be coupled to the data store 210 and/or the social graph 220 to store and manipulate (e.g., retrieve, update, delete, etc.) data stored therein.

The social network application 122 may regulate access to the content shared in association with the event. In some embodiments, the social network application 122 may reference the event definition to determine access parameters and provide access based thereon. For instance, if the event definition restricts access to the shared content to particular users, (e.g., invitees to the event (explicit invitees, friends of invitees, users who heard about or stumbled upon the event, etc., invitees that actually attended the event and/or met an exemption requirement, etc.) the social network application 122 may limit sharing of the shared content accordingly.

The social network application 122 may share event-associated content with an event invitee and permit the event invitee to share his/her event-associated content with other event invitees based on one or more parameters of the event definition, as discussed further elsewhere herein, such as the invitee's location inferred from the location of the invitee's client device.

The social network application may determine if an event invitee is within the geofence associated with a given event by receiving geofencing data indicating such from the geofencing engine 124 and/or the data store 210. In some embodiments, even if an invitee is not within the geofence or approaching the geofence, the social network application may provide access to the invitee to share and receive shared content if the invitee meets an exemption requirement (e.g., defined by the event definition). As an example, the social network application 122 may share event-associated content with a user as the user approaches or is within the geofence and stop sharing once the user leaves the geofence. As a further example, an attendee who is driving to the event may be exempted to share content while en route with the other attendees or a group of the attendees (e.g., attendees belonging to a particular social networking group as reflected in the social graph 220).

The social network application 122 may share the content in a variety of ways, such as but not limited to, by injecting the event-related content into each applicable user's content stream, by offering a content stream dedicated to the event that can be accessed the users and may include all content shared by the applicable event invitees, by messaging the event-related content using a messaging service (e.g., instant message, SMS, email, etc.).

The social network application 122 may send the event-related shared content to the various instances of the location-aware client application 108 (or another application) operable on the client devices 106 of the invitees for presentation thereby to the invitees. In some embodiments, the shared content may be included in a web page and/or or provided as a data object (e.g. XML, JSON, etc.) for processing and rendering by the location-aware client application 108, although numerous other variations are also possible. In some embodiments, the social network application 122 may include data APIs configured to provide social-network related content (e.g., social graph data, user data, content data, etc.) to other entities of the system 100, provided the applicable users' have authorized such data access.

The social network application 122 can adapt the sharing of the content between the invitees associated with the event based on dynamic changes made to the event, such as the duration of the event, the location of the event (e.g., changes to the scope and character of the geofence associated with the event based on the movement patterns of the attendees of the event). For instance, as sub-geofence(s) are derived off of the originating geofence, as reflected in the geofencing data stored in the data store 210 and maintained and updated by the geofencing engine, the social network application 122 can regulate the sharing of content between the users associated with the differing geofences (originating geofence, sub-geofence(s)).

In some embodiments, each sub-geofence may have its own access control list that provides users associated with that geofence to share content associated with the event privately between themselves or promote content to the originating geofence and/or other sub-geofence(s) derived from the originating/main geofence. For instance users of one sub-geofence can share content with another sub-geofence without sharing the content with a larger audience associated with the main geofence. The access control lists for the geofences may be managed dynamically by the geofencing engine 124 as it manages the geofences and sub-geofences. The access control lists may be stored and retrieved from storage (e.g., the memory 204, the data store 210) by the social network application 122 and/or the geofencing engine 124

The geofencing engine 124 includes software and/or hardware for creating, managing, and dissolving geofences. The geofencing engine 124 may use data provided by the social network application 122, location engine 126, and/or events planning engine 128 to create, manage, and dissolve the geofences. The geofencing engine 124 may receive the data provided by these entities directly or from data storage (e.g., the data store 210). The geofencing engine 124 may be electronically communicatively coupled to these and other entities to send and receive data.

The geofencing engine 124 may schedule geofences for events planned using the events planning engine 128. In some embodiments, the events planning engine 128 may signal the geofencing engine 124 to schedule a geofence for an upcoming or impromptu event. The geofencing engine 124 may define a geofence for an event based on the parameters included in the event definition generated by the events planning engine 128. For example, the geofencing engine 124 may define the area of the geofence associated with the event using one or more locations provided in the event definition. The geofencing engine 124 may define the duration of the geofence based on the duration defined in the event definition. As discussed elsewhere herein, the duration may be fixed, dynamic, open-ended, reoccurring, etc. The geofencing engine 124 may access the event definition from data storage (e.g., the data store 210) or may receive a signal from the events planning engine 128 indicating such.

The geofencing engine 124 may generate (e.g. create, initialize) a geofence for an event at a time corresponding with the start time of the event, as determined by the event definition. In some embodiments, the start time of the geofence and be the same as the start time of the event, or maybe earlier or later depending on the preferences of the event stakeholder (e.g., the event planner or delegate thereof). For example, in some embodiments, event stakeholder may prefer to have the geofence active before the event begins so participants can begin communicating about the event beforehand, and may specify (in the event definition) a start time for the geofence independent of the start time of the event geofence or at certain time prior to the start time of the event. This is helpful as it can generate a buzz about the event beforehand and increase the probability of some invitees may be considering not coming to the event actually attend, thereby increasing the overall attendance and success of the event.

The geofencing engine 124 supervises which users are within the geofence, and whether and/or when they enter and exit the geofence. The geofencing engine 124 may generate geofencing data describing which individual users are within the geofence and whether and when they enter and exit geofence to the social network application 122 so that the social network application 122 can share content based on whether event invitees are within the geofence, as discussed elsewhere herein. The geofencing engine 124 may store the geofencing data in the data store 210 as geofencing data 218, for access and/or retrieval by it or other components of the social platform 120, such as the social network application 122.

To determine whether a particular event invitee is within the geofence, approaching the geofence, split off from the geofence, or unassociated with the geofence, etc., the geofencing engine 124 may access location data indicating the location history of the invitees including the invitees' current locations, which may be received, stored, and/or provided by the location engine 126, as discussed elsewhere herein. The invitees' current locations may be inferred from location data captured by the invitees' client devices 106 and processed as discussed elsewhere herein, for instance, with reference to the location engine 126.

The geofencing engine 124 can divide a geofence into multiple associated geofences (e.g., two or more sub-geofences, a main geofence and sub-geofence, etc.). The geofencing engine 124 may also merge associated geofences (e.g., a main geofence and sub-geofence, two or more sub-geofences, etc.). In some embodiments, the geofencing engine 124 may derive one or more sub-geofences from an initial geofence to accommodate movement patterns of the attendees of the event during the event, as discussed in further detail elsewhere herein. For instance, for a larger event, such as a conference with thousands of people in attendance, a user may create a sub-geofence (e.g., for a concurrent party or after-party) and the geofencing engine may splinter off a group from the originating geofence into the sub-geofence.

In some embodiments, the geofencing engine 124, in cooperation with the events planning engine 128, may allow users to convert the sub-geofence into a separate event that is unassociated with an originating event and geofence and sub-geofences (if applicable). For example, the event attendees associated with the sub-geofence may provide input instructions instructing the events planning application 128, the social network application 122, or another component to convert the sub-geofence into a new event that includes the event attendees that are within the sub-geofence. In response, the events planning application 128, in cooperation with the other components of the social platform 120, may generate a separate event and geofence for these users using the data (e.g., location data, geofencing data, etc.) associated with the sub-geofence and/or provided by the users for the new event.

The geofencing engine 124 stores data describing the geofences in the data store 210 as geofencing data 218. The geofencing engine 124 may update the geofencing data 218 to reflect changes to the state of the geofences. Example state changes include, but are not limited to, the start time, duration, and/or end time of the geofence, the users associated with the geofence (e.g., invitees that entered, exited, are/were within the geofence), the amount of time users were within the geofence, the area of the geofence, access control, etc.

The geofencing engine 124 may maintain access control lists for all geofence types in a given geofence environment (e.g., originating geofence, sub-geofences derived therefrom, etc.). In some embodiments, these access control lists allow the geofence and sub-geofence(s) to have their own access control levels, which in-turn provides users customized control in sharing content. For instance, users may elect to share content locally within their own sub-geofence, across specific sub-geofences, across the entire geofence environment, etc. As a further example, users can restrict sharing content to users within the sub-geofence, allow the shared content to be included in the originating geofence, allow for an unrestricted/unregulated sharing across geofences, etc. In these embodiments, a user can elect to remove themselves from a current sub-geofence and join another sub-geofence, the originating geofence, a different geofence, etc. In some embodiments, the geofencing engine 124 may store and manipulate the access control lists in data storage (e.g., data store 210) with the geofencing data 218.

The location engine 126 includes software and/or hardware for receiving, processing, storing, and/or providing location data. With user consent, the location engine 126 may receive location data from users of the social platform 120. The location data may be provided by instances of the location-aware client application 108 operating on the client devices, or another application operating thereon. Location data provided by these applications may include any geo-location data specifying the geographic location of the users 114, such as GPS coordinates, an IP address, mobile carrier data, an explicit check-in, etc.

The location engine 126 may process and store the location data in the data store 210 for access and/or retrieval by it and/or other components of the social platform and/or provide it to other components of the social platform 120. The location data may include a location history including a current location if available for each of the users of the social platform 120 that are providing such data.

The location engine 126 may be coupled to the social network application 122, the geofencing engine 124, the events planning engine 128, the instances of the location-aware client application 108, etc., to send and receive data, and may be coupled to the data store 210 to store and manipulate (e.g., retrieve, update, delete, etc.) data stored therein.

The events planning application 128 includes software and/or hardware for planning and managing events. Users may use the events planning application 128 to plan events, revise events, delete events, access content shared in association with the events, view event activity and analytics, share the events (e.g., upcoming, ongoing, transpired, etc.) with other users, etc. A user may input parameters defining event into a corresponding user interface presented by an application operating on his/her client device 106, such as the location-aware client application 108, and submit the event definition to the events planning application 128.

The events planning application 128 may receive and process the event definition to create a corresponding event record, initiate creation of a corresponding geofence, invite attendees and receive confirmations therefrom, etc., as discussed in further detail elsewhere herein. In some embodiments, the events planning application 128 may query the social graph 220 of the social network and provide the social graph data for presentation to the event planner to facilitate the creation of the event. For example, the events planning application 128 may query the event planner's social graph, which is stored in/managed by the social graph 214, to access a list of that user 114's social network contacts, including social groups, which the event planner can use to easily identify which users to invite to the event. For instance, for a family party, the event planner may select a social network group that includes that user's family members instead of having to select each individual separately.

The events planning application 128 may use the social graph data to notify the invitees of the event. For instance, the social graph data may include the invitees' electronic contact information (e.g., SMS phone number, email address, social network address, etc.) and the events planning application 128 may use this information to notify the invitees about the event and request confirmation to the event. In some embodiments, the contact information of the invitees may be explicitly included in the event definition by the event stakeholder.

After creating the event, an authorized user may revise or delete the event by requesting the event definition and providing corresponding input to revise it, and then submitting those changes. The events planning application 128 may receive the revised event definition and process and/or store it accordingly.

In some embodiments, an event may be a recurring event. For example, the event may be a routine event that is held every month, and an event stakeholder, such as the event planner or a delegate thereof, may define the parameters for the recurring event in the event definition. As a result, the geofencing engine 124 may generate geofences for the event at routine intervals to facilitate the sharing of content between the attendees of the different occurrences of the event. The social network application 122 may be configured to share content across all occurrences of the event or may segment content sharing between specific occurrences. This advantageously allows content to either be shared with all attendees of the event regardless of which occurrence of the event they attended, or with the attendees of specific occurrences of the event.

In some embodiments, the events planning application 128 and/or the social network application 128 may generate data for presenting user interfaces that allow users to view the current location of other invitees to the event, being shared by those invitees, view areas associated with the event geofence(s) including (e.g., any sub-geofences that have been generated during the event and the users associated therewith), which users have attended, are approaching, have left, etc., the event, etc. It should be understood, that this data for presenting user interfaces may be generated by other components, such as the location-aware client application 108.

The events planning application 128 may be coupled to the social network application 122, the geofencing engine 124, the location engine 126, and/or the location-aware client application 108 to send and receive data, and may be coupled to the data store 210 and/or the social graph 220 to store and manipulate (e.g., retrieve, update, delete, etc.) data stored therein.

The social network application 122, the geofencing engine 124, the location engine 126, the events planning engine 128, and/or the location-aware client application 108 may require users 114 to be registered to use various acts and/or functionality provided by them.

The data store 210 is an information source capable of storing and providing access to data to the various entities coupled to the network 102. In some embodiments, the data store 210 could include a file system, a database management system (DBMS), etc. The DMBS could include a structured query language (SQL), a NoSQL DBMS, other types of DMBSs that store data that can be manipulated using programmatic operations (e.g., queries and statements to store, query, update, and/or delete data) by other components of the social platform 120 and/or the system 100. In some embodiments, the data store 210 stores information including but not limited to events data 212, shared content data 214, location data 216, and geofencing data 218, as discussed in further elsewhere herein.

With further reference to FIG. 3, the display device 310 represents any device equipped to present output signals generated and provided by the client device 106. In some embodiments, the display device 310 displays electronic images and data including, for example, user interfaces and formatted information. For example the display device 310 may include any available display device, monitor or screen, such as an organic light-emitting diode (OLED) display, a liquid crystal display (LCD), an e-ink display, etc. In some embodiments, the display device 310 includes a touch-screen display capable of receiving input from one or more fingers of a user 116. For example, the display device 310 may be a capacitive touch-screen display capable of detecting and interpreting multiple points of contact with the display surface. In some embodiments, the display device 310 may be coupled to the bus 206 via a graphics adapter which generates and provides display signals to the display device 310. The graphics adapter may be a separate processing device including a separate processor and memory (not shown) or may be integrated with the processor 202 and memory 204.

The input device 312 represents any device for inputting data on the client device 106. In some embodiments, the input device 312 is a touch-screen display capable of receiving input from the one or more fingers of the user 116. For instance, the functionality of the input device 312 and the display device 310 (e.g., display) may be integrated, and a user 116 of the client device 106 may interact with the client device 106 by contacting a surface of the display device 310 using one or more fingers. In this example, the user 116 may interact with an emulated (i.e., virtual or soft) keyboard displayed on the touch-screen display by using fingers to contacting the display in the keyboard regions. In some embodiments, the input device 312 is a peripheral device or combination of devices. For example, the input device 312 includes a keyboard (e.g., a QWERTY keyboard) and a pointing device (e.g., a mouse or touchpad). The input device 312 may also include a microphone or other known peripheral device.

The capture device 314 represents a digital image capture device capable of capturing still and motion images, and sound. The capture device 314 is coupled to the bus 206 for communication and interaction with the other components of the client device 106. The capture device 314 may include a lens for gathering and focusing light, a photo sensor including pixel regions for capturing the focused light and a processor for generating image data based on signals provided by the pixel regions. The processor may be integrated with the processor 202 of the client device 106 or may be separate therefrom. In some embodiments, the processor of the capture device 314 is coupled via the bus 206 to store image data in the memory 204. By way of example and not limitation, the photo sensor may be any type of photo sensor including a charge-coupled device (CCD), a complementary metal-oxide-semiconductor (CMOS) sensor, a hybrid CCD/CMOS device, etc. In some embodiments, the capture device 314 may include a microphone (not shown) for capturing sound or may be coupled to a microphone included in another component of the client device 106, such as the input device 312, or coupled directly to the bus 206. The capture device 314 may also include any available related features including flash, a zoom lens, etc.

While not depicted, the memory 204 may include a camera engine (e.g., a driver), which includes software storable in the memory 204 and operable by the processor 202 to control/operate the capture device 314. The camera engine may be communicatively coupled to the capture device 314 and the other components of the client device 106 via the bus 206, and these components may interface with the camera engine via the bus 206 to capture still and/or motion images (e.g., photos and videos) using the capture device 314.

The location sensor 316 includes hardware and/or software for determining a position of the client device 106. The location sensor 316 may include a receiver configured to receive positional data from a positioning system coupled to the network. In some embodiments, the positional data my include GPS or similar signals and the location 316 may determine the location of the client device 106 based thereon. In further embodiments, the client device 106's location may be determined based on network and/or cellular signals communicated by the communication unit 208.

The location-aware client application 108 or another application may retrieve the current location of the client device 106 from the location sensor 316 and/or the communication unit 208 (e.g., via a device driver) and utilize it to share and/or receive content, and/or provide location data including the location to the social platform 106 for use thereby to provide event-based sharing of content using geofences, as discussed in further detail herein.

In some embodiments, the positioning system (not shown) coupled to the network 102 could include a global positioning system (GPS), a differential global positioning system (DGPS), an assisted global positioning system (A-GPS), etc., a telecommunications system including a multilateration or triangulation engine, a geolocation system capable of determining an approximate geolocation of a client device 106 using an IP address of the client device 106 on the network 102 by cross-referencing the IP address with other information sources, such as internet server provider databases, internet registries, etc., or other location systems and/or mechanisms. It should be understood that in various embodiments any location-tracking system such as constellation systems like "hiball," magnetic tracking systems, optical tracking system, inertial tracking systems, etc.

The location-aware client application 108 includes software, operable by the client device 106, for utilizing the social network provided by the social network application 122 and the events planning service provided by the events planning engine 128. In some embodiments, the social networking and event planning features may be integrated into a seamless user experience or may be provided using different user environments by the location-aware software application or different applications. In some embodiments, the location-aware client application 108 may be software code operable in a web browser, may be software code operable by the client device 106 as a native application, a combination of the foregoing, etc.

The location-aware client application 108 may provide a user 116 interacting with the client device 106 mechanisms for sharing and/or receive shared content via the social network in association with an event, viewing the user's content stream, other users' content streams, a content stream associated with an event, etc. The location-aware client application 108 may display a variety of different user interfaces and options for utilizing the social network, planning and managing events, and/or configuring social network and event settings.

The location-aware client application 108 may communicate with the social platform 120 to send and receive related information, including location data, geofencing data, event-related data including event definitions, social network data including content being shared and/or received in association with the event and the geofence, etc. In some embodiments, the location-aware client application 108 may, in some embodiments, initiate a share request for sharing content with other attendees of an event that are located within a geofence or sub-geofence, as discussed in further detail elsewhere herein. The location-aware client application 108 may also receive and present event notifications, submit confirmations, authorize sharing requests, etc.

In some embodiments, the location-aware client application 108 may supervise a user's location based on position data determined by location sensor 316 and/or the communication unit 208 to determine whether that user has entered and/or exited any geofences/sub-geofences applicable to the user and send geofencing data describing such for use by the geofencing engine 124 and/or the social network application 122. In some embodiments, social network application 122 and/or the geofencing engine 124 may determine such using location data describing the user's location provided by the location-aware client application 108.

In some embodiments, the location-aware client application 108 is a set of instructions executable by the processor 202. In some embodiments, the location-aware client application 108 is stored in the memory 204 of the client device 106 and is accessible and executable by the processor 202. In any of these embodiments, the location-aware client application 108 may be adapted for cooperation and communication with the processor 202 and other components of the client device 106. In some embodiments, the location-aware client application 108 may be a stand-alone application or may be integrated into another application operable on the client device 106. In some embodiments, the location-aware client application 108 may interact with and provide other software applications stored in the memory 204 and executable by the processor 202 of client device 106 with various information via an API.

Figure 4:
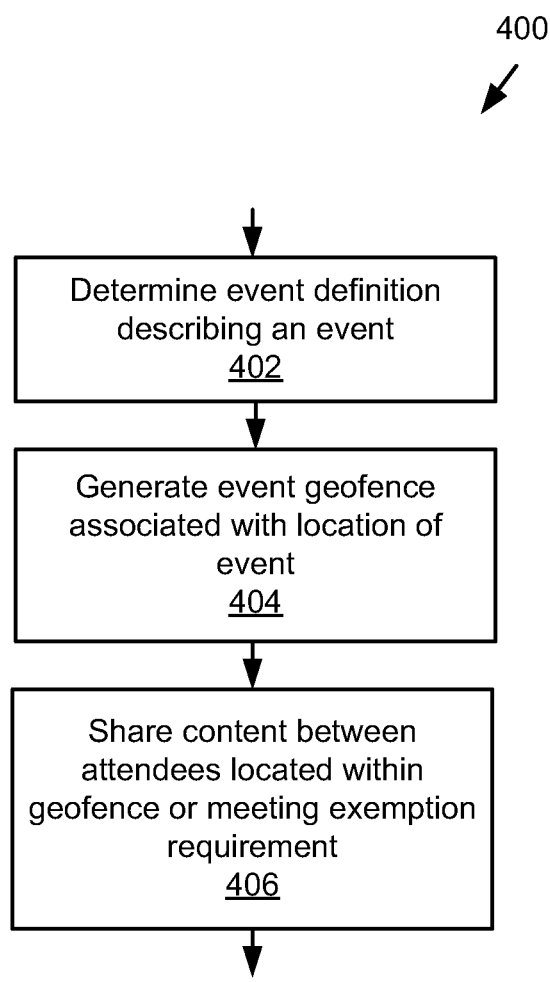
FIG. 4 is a flowchart of an example method for event-based content sharing using geofencing.

Referring now to FIGS. 4-11, various example methods are described. FIG. 4 is a flowchart of an example method 400 for event-based content sharing using geofencing.

In block 402, the method 400 determines event definition describing an event. In some embodiments, the event definition includes an event location, duration, and/or event invitees. The event definition may also include further information describing the event, such as a title, detailed description, content sharing parameters, etc., as described elsewhere herein. In some embodiments, a user may define event by inputting the event definition into an associated user interface presented by the user's client device 106. In some embodiments, the user may use the location-aware client application 108, or another application operable by the client device 106, to input the event definition. Once the event definition is input, the client device 106 may transmit data describing the event definition to the events planning application 128, which may process and store the event definition in association with the user in the data store 210 as event data 212, and/or provide the event definition to one or more other components, such as the social network application 122, the geofencing engine 124, and/or the location engine 126, as described elsewhere herein.

In block 404, the method 400 generates an event geofence associated with the location of the event described by the event definition. In some embodiments, the event geofence may be generated by the geofencing engine 124 to persist for a duration that corresponds to the duration of the event. For example, the event geofence may persist for the same duration as the event, may be defined to begin and end at a certain time prior to or after the start and end time of the event, may have a dynamic duration that adapts to the evolution of the event (e.g., start as a critical mass of attendees arrive at the site of the event and/or end as the critical mass leaves the event), etc. In a further example, an event may originally be defined to end at a certain time but because there are attendees who are still at the event, the geofencing engine 124 may extend the event to allow those users to continue to share content. In another example, the events planning application 128 or other component of the social platform 120 may notify an event organizer and/or a delegate thereof that the event is due to end and ask whether the event should be extended. In response, the event organizer and/or the delegate may extend the event by providing a corresponding input into an associated user interface, which the geofencing engine 124 may receive and thereby use to extend the persistence of the geofence and the social network application 122 may allow the users associated with the event to continue sharing content privately with one another. The geofencing engine 124 may provide location data to or may store location data in the data store 210 for retrieval by the social network application 122 that indicates to the social network application 122 which geofence a particular user is associated with.

In block 406, the method 400 may privately share content between attendees of the event that are located within the event geofence or within a certain proximity to the geofence. In some embodiments, the geofencing engine 124 or another component of the system 100, such as the location-aware client application 108 or the social network application 122, may determine which invitees have entered the geofence based on a user's location data based on location data associated with that user or an exemption requirement. If so, those invitees are considered event attendees and the social network application 122 may share content between them.

In some embodiments, to receive content, attendees must be within a geographic area/perimeter of the geofence. For example, if the location of the event is a particular restaurant, the geofence covers the area of the restaurant (e.g., the parking lot, the building, etc.) and the attendees must be within that area to receive content shared by other attendees. In some embodiments, the geofence may cover multiple locations. For example, an event defined by a user (e.g., a birthday party, a reunion, a conference, etc.) may include more than one location (e.g., at various locations within a particular city or state, a locations in different states or countries (e.g., New York and Los Angeles)) and the geofence area may cover those locations to allow users in attendance of the event to automatically share content even though they are attending in multiple locations.

In some embodiments, an attendee that is not specifically within the geofence area may still receive and or share content with the other attendees that are within the geofence area if that attendee meets one or more exemption requirements. The exemption requirements may include, but are not limited to, that the attendee confirmed that he/she is attending the event, the attendee is en route to the event, that the attendee opted to attend the event virtually, etc.

In some embodiments, the scope of the sharing may be limited to just those users currently in attendance of the event and when a given attendee who is within the geofence leaves the geofence, the social network application 122 may cut that user off from receiving further content from other attendees. In some cases, the user may no longer be able to access any content that was shared until the user re-enters the geofence.

As another non-limiting example of the method 400, an event definition may specify which users have access to the content being shared by the invitees and for what duration access to the content is granted. For instance, the sharing may be constrained by certain event parameters, and only allow certain people (e.g., confirmed attendees, specific confirmed attendees specified by a user, etc.) within the geofence to share content for the duration of the event, although numerous other variations are also possible. In a further example related to photos, users can configure the social network application 122 to automatically start sharing a user's photos associated with the event once the user has entered the geofence and automatically stop sharing the photos once the user has exited the geofence. Also, it should be understood that any type of digital content may additionally or alternatively be shared, such but not limited to as status updates, location, social network posts, videos, news articles, links to web-based content, files, etc.

In some embodiments, if an invitee has confirmed that he/she will be attending the event, that user may initially receive content shared in associated with the event (e.g., for a certain period of time) but may eventually be cut off if he/she doesn't eventually enter the geofence area (e.g., within a certain timeframe).

In some embodiments, an invitee may be incapable of physically attending one of the event locations (e.g., may be deployed in a remote region) and the event definition may allow that user to indicate that he/she will be attending the event virtually. This allows that user to participate in/virtually attend the event even though he/she is unable to physically be at the event.

In some embodiments, location data may be captured by the user's client device 106 and then compared by the geofencing engine 124 or another component, such as the location-aware client application 108, to the geofence area and/or exemption requirements to determine whether the user is allowed to share content with other attendees of the event.

Figure 5:
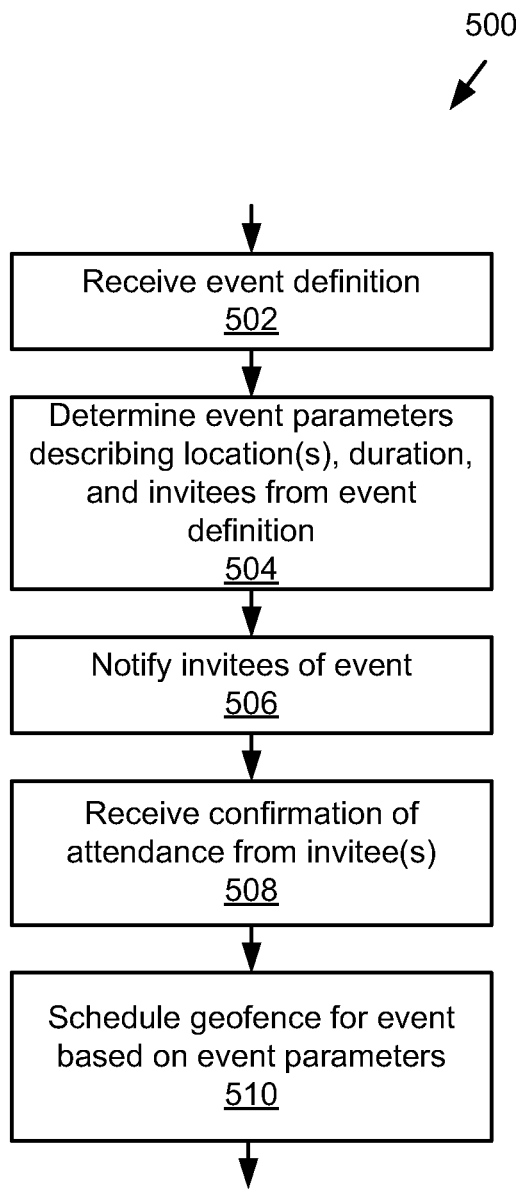
FIG. 5 is a flowchart of an example method for creating an event and scheduling an associated geofence.

FIG. 5 is a flowchart of an example method 500 for creating an event and scheduling an associated geofence.

In block 502, the method 500 receives an event definition and in block 504 determines one or more event parameters describing one or more locations, an event duration, and/or or more invitees from the event definition. In block 506, the method 500 notifies the invitees about the event. In some embodiments, the events planning application 128 receives and processes the event definition and invites the invitees to the event. For example, the events planning application 128 notifies each of the invitees defined in the event definition about the event and asks the invitees to RSVP for the event (e.g., by providing input indicating that the invitee will be attending, is tentatively planning to attend, or is not planning to attend).

In some embodiments, the events planning application 128 notifies an invitee by injecting a notification into that invitee's social network content stream hosted by the social network application 122, sending the invitees notification via a messaging system provided by the social network application 122, sending the invitee a notification via an electronic message, such as a message sent through a messaging system provided by the social network application 122, an electronic message (e.g., e-mail, SMS, instant message, microblog, another social network, voice message, etc.) sent by another messaging system, such as one provided by the social platform 120 or a third-party application 136 executable by a third-party server 134.

In block 508, the method 500 receives confirmation of attendance from one or more of the invitees. For example, the events planning application 128 receives a confirmation from the invitee. The confirmation may be provided in response to selecting a corresponding user interface element indicating that the invitee will be attending. For instance, the invitee may select a "yes" button provided in association with the notification that was injected into the invitee's social network content stream or presented in association therewith. In further embodiments, the confirmation may be received in an electronic message (e.g., e-mail, SMS, instant message, microblog, another social network, voice message, etc.) sent in response to the invitation. In some embodiments, the invitation may include an electronic link (e.g., a hyperlink), and the user may select the electronic link and then fill out and submit a form provided responsive to the link selection. Numerous other variations are also possible.

Responsive to receiving the confirmations from the invitees, event planning application 128 may store the confirmations in the data store 210 as event data 212. For example, the events planning application 128 may store the confirmations in association with an electronic record that reflects the event definition including the parameters of the event.

In block 510, the method 500 may schedule a geofencing for the event based on one or more of the event parameters. In some embodiments, the geofencing engine 124 may schedule the geofencing to persist for a duration to corresponds to the duration of the event and to have a perimeter to corresponds to the one or more locations included in the event. In some embodiments, the geofence may be stored as geofence data 218 in the data store 210, cached, client-side to the client devices 106 of the invitees, for reference once the geofence is scheduled to become active, and the event to begin.

In some embodiments, the events planning application 128, the geofencing engine 124, or another may associate the geofence with the invitees of the event so that when the invitees enter or exit the geofence, their presence or absence may be identified. In some cases, an invitee is associated with the geofence once the invitee has confirmed attendance. In some cases, all invitees may be associated with the geofence so that any invitees that did not confirm attendance but ended up showing up may still participate in the event and share content. Additional variations are also possible and contemplated.

As a further non-limiting example associated with the method 500, once an event definition has been input, the event stakeholder (the event creator/planner or a delegate user thereof) may instruct the events planning application 128 to notify the invitees of the event (e.g., by selecting an invite button on a user interface that includes form fields for specifying the event parameters). In response, the events planning application 128 may notify the invitees of the event by sending them an invitation to the event using any available electronic notification mechanism, such as posting an electronic invitation including the event details or a link thereto to the users' social network content stream, sending the users an electronic invitation or a link thereto (e.g., email, SMS, instant message, proprietary messaging mechanism, etc.), placing an automated call and/or leaving an automated voice message, etc. In response to receiving an invitation, an invitee may confirm attendance by selecting an appropriate option in an associated user interface. As users confirm attendance, the event creator, coordinator, etc., may be notified via electronic message and/or may monitor such by viewing event-related information in an associated user interface.

Figure 6:
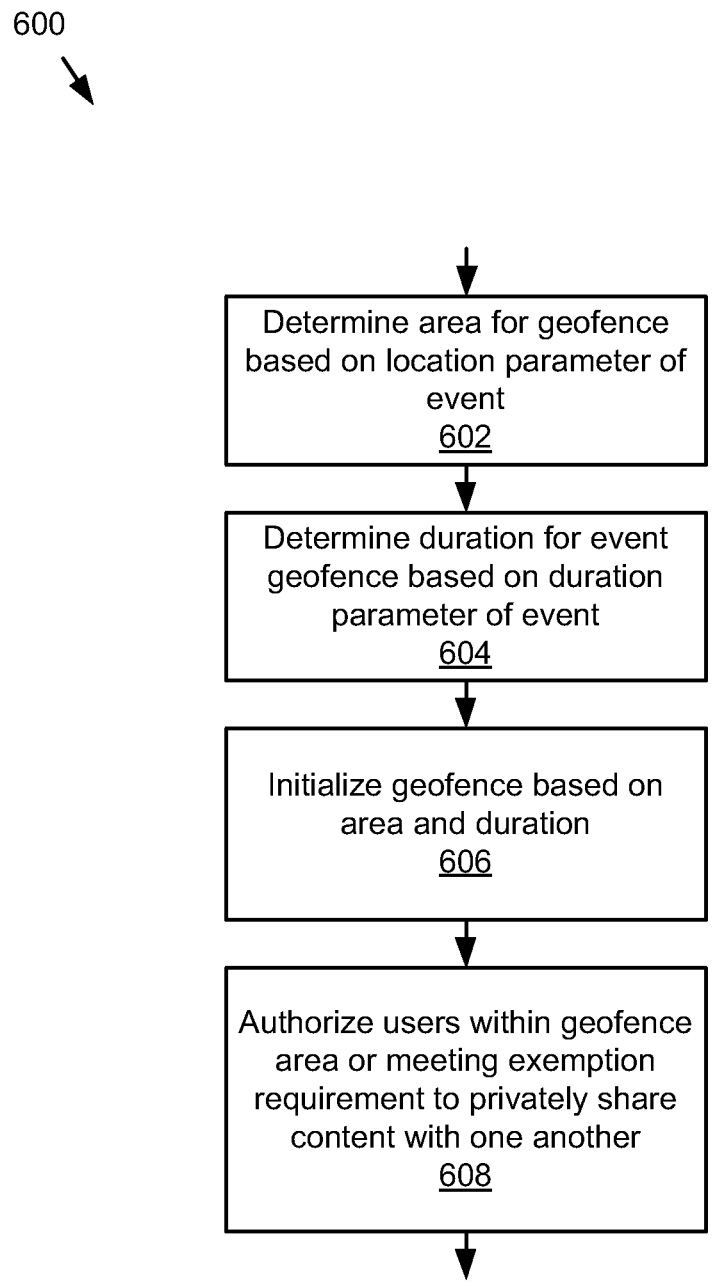
FIG. 6 is a flowchart of an example method for initializing a geofence for an event.

FIG. 6 is a flowchart of an example method 600 for initializing a geofence for an event. In block 602, the method 600 determines an area for the geofence based on location parameters of the event and in block 604 determines a duration for the geofence based on duration parameter of the event. In block 606, the method 600 initializes the geofence based on the area and the duration. In some embodiments, the geofencing engine 124 determines the area and the duration for the geofence based on the event definition. The geofencing engine 124 may receive the event definition from the events planning application 128, the data store 210, or another component of the system 100. In some embodiments, the geofence may be scheduled for initialization at a particular time and/or for a given duration (fixed, flexible, etc.), and the geofencing engine 124 initializes the geofence accordingly.

In block 608, the method 600 authorizes users within the geofence area or meeting one or more exemption requirements to privately share content with other. In some embodiments, the social network application 122 may permit qualifying users associated with the event, such as those within the geofence area and meeting one or more exemption requirements, to share content with one another.

Figure 7:
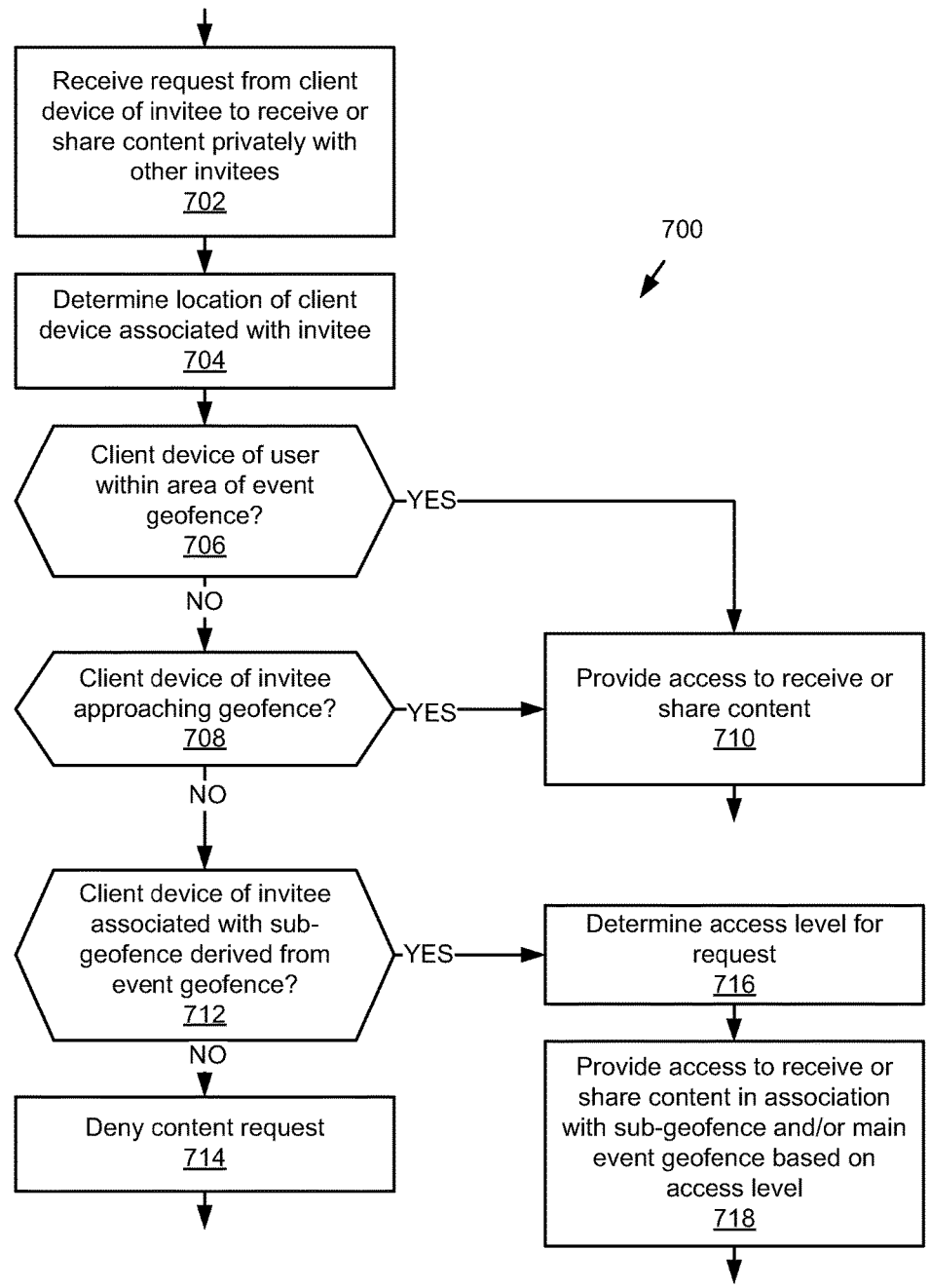
FIG. 7 is a flowchart of an example method for managing content sharing based on user location.

FIG. 7 is a flowchart of an example method 700 for managing content sharing based on user location. In block 702, the method 700 receives a request from a client device 106 of an event invitee to receive or share content privately with other invitees to the event. In some embodiments, the social network application 122 may receive the content request.

In block 704, the method 700 determines location of the client device 106 associated with the requesting invitee and then, in block 706, whether the client device 106 of the invitee is within the area of the event geofence, e.g., by comparing the client device 106 location to the area. By doing so, the method 700 can reliably verify whether the invitee is in attendance of the event. In some embodiments, the geofencing engine 124 and/or the location-aware client application 108 may provide geofencing data to the social network application 122 indicating whether the user is located within the geofence, and the social network application 122 may use the geofencing data to determine whether to provide access to the invitee to receive or share content in association with the event, as discussed further below.

If the invitee is determined in block 706 to be within the geofence area, the method 700 provides access in block 710 to the invitee to receive or share content with the other invitees within the geofence (also in attendance). If the invitee is not determined to be within the geofence area, the method 700 may determine in block 708, based on the location data of the client device 106 of the invitee, whether the client device 106 of the invitee is approaching the geofence area. In some embodiments, the geofencing engine 124 receive location data from the location engine 126 and/or the data store 210 and determine whether the invitee is approaching the geofence area based thereon.

If in block 708, the method 700 determines that the client device 106 of the invitee is approaching the geofence area, the method 700 provides access in block 710 to the invitee to receive or share content with the other invitees that are within the geofence. In some embodiments, the social network application 122 may receive data from the geofencing engine 124 and/or the location-aware client application 108 indicating that the invitee is approaching the geofence, based on the indication, the social network application 122 may permit the invitee to receive and/or share content with the other invitees in attendance of the event. In some embodiments, the geofencing engine 124 and/or the location-aware client application 108 may determine that invitee is approaching geofence by receiving location data from the client device 106 overtime showing the progression (e.g., movement of the client device 106) toward the geofence. For example, the location engine 126 may receive location data from the client device 106 and store the location data in the data store 210 for retrieval by the geofencing engine 124 and/or may provide the location directly to the geofencing engine 124.

If in block 708, the method 700 determines that the client device 106 of the invitee is not approaching geofence area, the method 700 proceeds to block 712 where it determines whether the client device 106 of the invitee is associated with (e.g., within) a sub-geofence derived from the main event geofence (or another sub-geofence also derived from the main event geofence), as discussed elsewhere herein. If so, the method 700 determines an access level for the share request received from the invitee in block 716 and then provides access to the invitee to receive or share content in association with a sub-geofence and/or the main event geofence commensurate with the access level in block 718. In some embodiments, the access level may be defined by the requester and/or one or more other users also associated with a sub-geofence (e.g., located within the sub-geofence as indicated by the location data determined by their client devices 106). In some embodiments, the access level may be automatically determined based on whether the user's client device 106 is located within the sub-geofence. Further variations are also possible and contemplated.

Allowing users to attend the event and share content via a sub-geofence is advantageous because it, for example, allows users who are within a certain proximity of one another to only share content with each other if desired. In further examples, it also allows users of the sub-geofence to push some relevant content up to the other attendees within the main-geofence while preserving other relevant content for just those users who are within the sub-geofence.

If in block 712, the method 700 determines that the client device 106 of the invitee is not associated with a sub-geofence, the method 700 in block 714 denies the content request received from the invitee. In some embodiments, the invitee may be notified of the denied request via a notification or prompt presentation on his or her client device 106. In some embodiments, the social network application 122 may trigger presentation of the notification or prompt sending a corresponding notification or prompt signal to the client device 106 and the location-aware client application 108 may receive and process the signal, and generate and present the corresponding connection or prompt to the invitee.

Figures 8A, 8B:
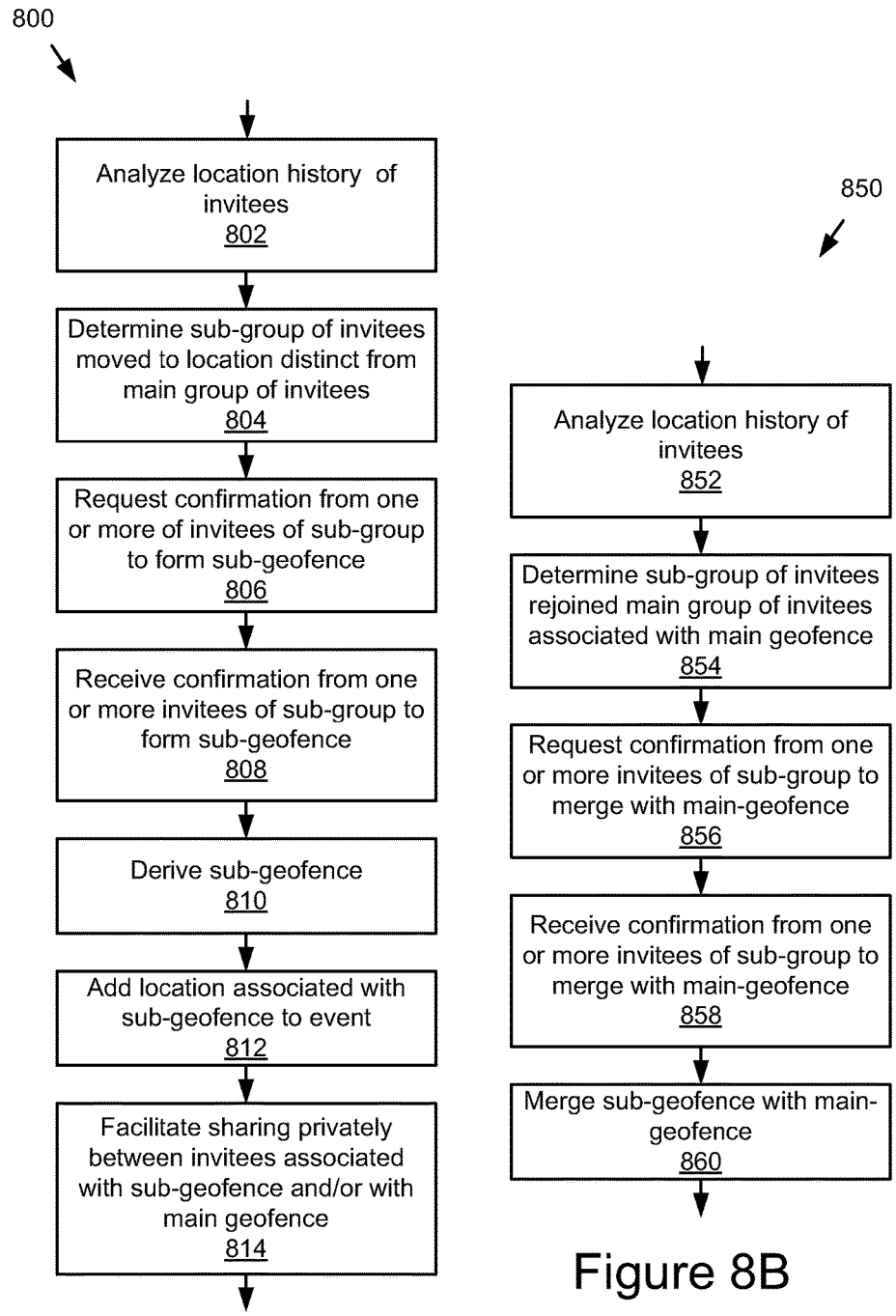
FIGS. 8A and 8B are flow charts of example methods for splintering and/or merging geofences.

FIGS. 8A and 8B are flow charts of example methods 800 and 850 for splintering and/or merging geofences. Regarding method 800, in block 802, the method 800 analyzes the location history of each of the invitees to the event. In some embodiments, the location engine 126 receives location data from the client devices 106 of invitees to the event and processes the location data to determine each invitee's movement over time and stores data describing movement as location data 216 in the data store 210 and/or provides the movement data to other components of the system 100, including, for example, the geofencing engine 124, the social network application 122, the event planning application 128, etc. The location engine 126 may also store the invitees' location data in the data store 210 and/or provide it to the other components.

In block 804, the method 800 determines that a sub-group of invitees to the event moved to a location distinct from the main group of invitees based on the movement data. For example, the sub-group of invitees may have originally been with the main group of invitees within the geofence associated with the event and then migrated from that main group to another location. As further example, a small group of friends that are attending a party at a nightclub left to go to a pub down the street to get drinks and some food. The geofencing engine 124 may determine that this group of friends left the main group of party attendees at the nightclub and went to the pub based on the movement data of this group of friends.

In block 806, the method 800 may request confirmation from one or more of the invitees of the sub-group to form a sub-geofence. In some embodiments, upon determining that the sub-group has moved to a location distinct from the main group of invitees, the geofencing engine 124 may trigger the sending of notification requesting confirmation from one or more of the event invitees in that sub-group to form a sub-geofence. In block 808, the method 800 may receive confirmation from one or more invitees of the sub-group to form the sub-geofence. For instance, responsive to triggering the sending of notification requesting confirmation from one or more of the event invitees, the geofencing engine 124 may receive a corresponding response authorizing and/or rejecting the formation of the sub-geofence and the geofencing engine 124 may form or not form based on the responses.

In some embodiments, the geofencing engine 124 may forgo requesting confirmation and may automatically form the sub-geofence to provide an option to the event attendees in the sub-group to share content privately with one another or promote the content to the event invitees associated with the originating geofence and/or other sub-geofences.

In block 810, the method 800 may create a sub-geofence from the main geofence. In some embodiments, the geofencing engine 124 may initialize the sub-geofence based on the confirmation responses or may autonomously initialize a sub-geofence.

In block 812, the method 800 may add the location associated with the sub-geofence to the event. In some embodiments, responsive to or in association with the creation of the sub-geofence, the geofencing engine 124 may update the event data 212 in the data store 210 describing the event to include the location of the sub-geofence.

In block 814, the method 800 facilitates sharing privately between the invitees associated with the sub-geofence and/or the main geofence. The social network application 122 is configured to compartmentalize and/or merge the sharing by the sub-groups and the main group based on which sub-geofence the content originates from and/or the access level associated with the content, as discussed elsewhere herein. In some embodiments, the social network application 122 may receive signals from the geofencing engine 124 and/or may access location data stored in the data store 210 reflecting if content being shared is associated with the main-geofence or a sub-geofence. The social network application 122 may also retrieve access control data from the data store 210 describing the scope of the content being shared, e.g., whether the content should be shared with attendees associated with a particular sub-geofence, shared across the main-geofence and any other sub-geofences, etc.

The social network application 122 may then share the content based on the location data and the access control data.

The method 800 is advantageous because, for instance, it allows users who are attending an event flexibility to continue sharing content as the event evolves. For example, attendees of the event may continue sharing content as they migrate from the original location of the event to other locations. These attendees may, in some cases, have reason to keep some of the content they are sharing amongst themselves, or may want to share that content with rest of the attendees of the event. It should be understood that multiple sub-groups and sub-geofences may be simultaneously maintained and associated with the main-geofence.

Regarding method 850, in block 852, the method 850 analyzes the location history of the invitees of the sub-group and in block 854 determines that the sub-group of invitees rejoined the main group of invitees associated with an originating or main geofence. In some embodiments, the geofencing engine 124 may determine that the sub-group rejoined the main-group based on the movement data associated with the users of the sub-group. Continuing a previous example, the small group of friends left the nightclub to go to a pub down the street to get drinks and some food may have returned to the main party at the nightclub, as determined by the geofencing engine 124 based on their movement data.

In block 856, the method 850 may request confirmation from one or more invitees of the sub-group to merge with the main-geofence and in block 858, the method 850 may receive a confirmation response from at least one of the one or invitees responsive to requesting confirmation. In some embodiments, the geofencing engine 124 may trigger the sending of a notification requesting confirmation from one or more of the invitees to rejoin the main-geofence. In some embodiments, notifications may be sent and confirmations received by the geofencing engine 124, the social network application 122, or the events planning application 128, although other variations are also contemplated. For instance, the location-aware client application 108 or another application, e.g., a messaging application, may present the notification to the corresponding invitee and receive and relay input provided by the user in response to the presentation of the notification to the geofencing engine 124, the social network application 122, or the events planning application 128, which may then process the confirmation responses accordingly.

In block 860, the method 850 may merge the sub-geofence with the man-geofence. In some embodiments, the geofencing engine 124 may dissolve the sub-geofence and associate the invitees from the sub-geofence with the main-geofence based on those invitees being located within the main-geofence as reflected by their location data. The method 850 is advantageous because, for example, it allows groups at an event that had splintered off the main group to conveniently and flexibly rejoin the main group and continue sharing content.

Figures 9, 10:
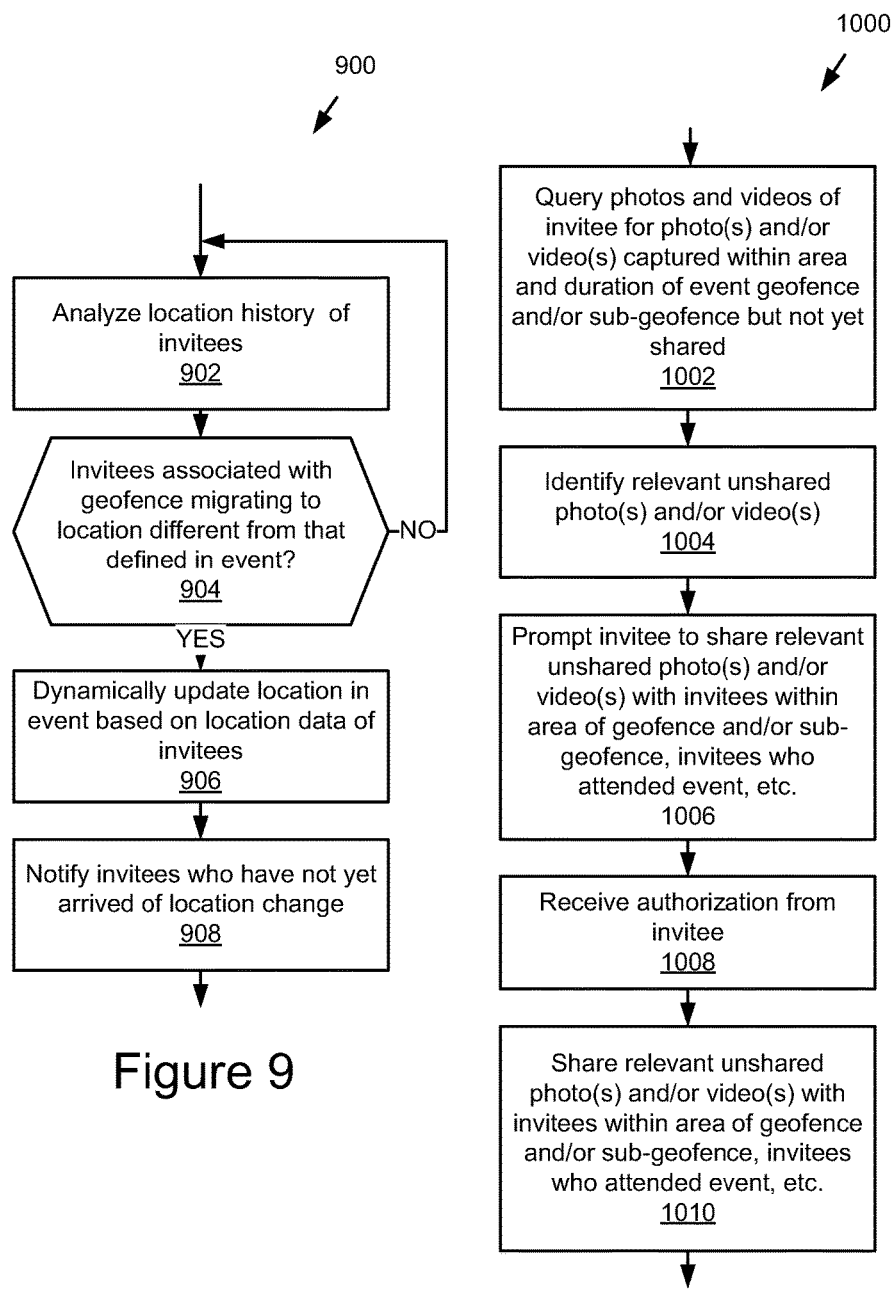
FIG. 9 is a flowchart of an example method for dynamically updating an event location based on geofence migration.
FIG. 10 is a flowchart of an example method for prompting sharing of unshared content.

FIG. 9 is a flowchart of an example method 900 for dynamically updating an event location based on geofence migration. In block 902, the method 900 analyzes the location history of the invitees and in block 904 determines whether the invitees of an event geofence are migrating to a location that is different from that included in the event definition based on the location history. For example, as discussed elsewhere herein, the location history may describe the movement patterns of the users associated with the geofence, such as whether the users have substantially, collectively exited the geofence and are migrating to another location. In some embodiments, the geofencing engine 124 may receive and/or access location data 216 describing the location history of the invitees of the event from the data store 210 and may compare the location history including the invitees most recent locations to the area of the geofence to determine whether those users are migrating to another location.

If the method 900 determines in block 904 that the invitees associated with the geofence are migrating, the method 900 may dynamically update the location of the event based on the location data of the invitees in block 906. In some embodiments, the location may be dynamically updated by the geofencing engine 124 or another component (e.g., the events planning application 128, the social network application 122) if a majority or other significant cluster of invitees who were in attendance are migrating together. In a further example, if the location data of the event planner or the person or persons that the events was planned for our migrating along with other attendees to another location, the location of the event may be dynamically updated even if they do not represent the majority of the invitees who were in attendance of the event, although numerous other variations are also possible and contemplated. As a location of the event is updated, the geofencing engine 124 may adapt the geofence to include the migratory path of the invitees, the eventual destination of the invitees, any points of interest along the way, etc., in the geofence. The social network application 122 may continue sharing content amongst the invitees determined to be in attendance of the event based on the dynamically updated geofence (and/or with those meeting any exemption requirements).

In block 908, the method 900 can notify the invitees who have not yet arrived at the location of the event of the location change. For example, responsive to the location change, event planning application 128 or the social network application 122 may send a notification to the invitees indicating the location change.

The method 900 is advantageous because, for example, it allows the invitees in attendance and/or exempted to continue sharing content as the event evolves, and can restrict further content sharing with users who actually leave the event.

In some embodiments, event invitees may access user interface that shows the event location real-time as well as any changes to that location, such as any sub-groups that may have splintered off of the main group, the users associated with each of the sub-groups, the users associated with the main group, the migratory paths of any of the sub-groups, the main group, etc. This is advantageous as invitees who have not yet arrived may be informed in advance of any location changes without having to personally contact the event planner or other attendees of the event, and allows those invitees to identify and arrive at the proper event location. In these embodiments, the social network application 122 (or another component of the social platform 120 or system 100) may generate data describing the location and migratory path of the event, including the geofence and the users associated with it, as well as any sub-geofences if applicable and the users associated with them, or provide this data to the client devices 106 of the invitees, including those not yet in attendance.

In some embodiments, the users within a sub-geofence that has splintered off of the main geofence, may elect to keep the sub-geofence private, and the sub-geofence may be hidden from view in the user interface. For example, some users may be planning surprise for the attendees in the main geofence and a splitter off into a sub-group to carry out the surprise. In this example, the users may provide input instructing the geofencing engine 124 that the sub-group should be kept private. The geofencing engine 124 may store data indicating such as the social network application 122 or other component may hide the sub-group from being discovered.

FIG. 10 is a flowchart of an example method 1000 for prompting sharing of unshared content. In block 1002, the method 1000 queries photos and videos of an invitee who attended an event for photographs and videos captured within the area and duration of the event geofence and/or a sub-geofence but have not yet been shared in association with the event. In some embodiments, the location-aware client application 108 or another application operable by the client device 106 of the invitee (e.g. the operating system) may query the data storage of the invitee for photographs and videos, which may be stored in the client device 106, on a computing device coupled to the network 102, such as a third-party server 134 hosting a cloud storage service embodied by the third-party application 136, or the social platform 120, although other variations are also possible and contemplated.

In block 1004, the method 1000 identifies relevant unshared photographs and videos. In some embodiments, the photographs and videos queried in block 1002 are compared with the content shared by the user via the social network application 122 with other invitees of the event in association with the event to determine which of the photographs and videos, if any, have not yet been shared. In some embodiments, metadata associated with the photographs and videos is used to determine whether or not the photographs and videos are related the event.

For example, metadata such as location data identifying where the photographs and videos were captured and timing data such as the date and time the photographs and videos were captured may be compared to corresponding parameters of the event definition, such as the location and duration (e.g., start time and end time) of the event to determine whether the photographs and videos are relevant to the event. In a further example, data, such as identity tags identifying the users depicted in the photographs and videos, may be compared to the invitees included in the event definition and/or confirmed as having attended the event (e.g., based on their location history, confirmation of attendance, etc.) to determine whether the photographs and videos are relevant to the event. Other variations are also possible and contemplated.

In some embodiments, the operations described in respect to blocks 1002 and 1004 may be performed by the location-aware client application 108 (or another application operable by the client device 106 of the user), a component of the social platform 120 (e.g., the social network application 122, event planning application 128, etc.), a combination of the foregoing, or another component of the system 100.

In block 1006, the method 1000 prompts the invitee to share relevant unshared photo(s) and/or video(s). In some embodiments, the location-aware client application 108 (or another application operable by the client device 106) prompts the invitee by displaying a notification requesting the invitee to share relevant unshared photo(s) and/or video(s). In some embodiments, the location-aware client application 108 may display notification responsive to identifying the photo(s) and/or video(s) in block 1004 or receiving corresponding signal from the social network application 122 or another component of the social platform 120.

In some embodiments, the method 1000 may be performed during the event to help promote content sharing between the invitees in attendance. For example, invitees that are identified by the geofencing engine 124 as being located within the geofence or sub geofence, may be prompted to share the photographs and/or videos that capture during the event. In some embodiments, the method 1000 may be performed after the conclusion of the event to provide a robust summary of the event from those who attended in some cases to those who were not able to attend the event. For example, after the event has concluded, the social network application 122 may provide access to the content shared by the invitees in attendance of the event and within the geofence and/or invitees meeting an exemption requirement, with the invitees that did not attend the event. The social network application 122 may determine whether a given invitee attended or is in attendance of the event based on signals from and/or location data stored by the geofencing engine 124, the invitee's location history, content shared by invitee during the time period of the event, attendance confirmation received from the invitee, or other data indicating the invitee was in attendance.

In block 1008, the method 1000 receives authorization from the invitee to share the photo(s) and/or video(s). In some embodiments, the social network application 122 (or another component of the social platform 120) receives the authorization responsive to the invitee being prompted to share the one or more photos in their videos.

In block 1010, the method 1000 shares the relevant unshared photo(s) and/or video(s) with the invitees within the geofence area and/or sub-geofence area(s), invitees who attended the event, etc., depending on the embodiment. For example, the social network application 122 may associate the previously unshared content with the event and shares it with the other invitees (within the geofence/sub-geofence areas, who were unable to attend, etc., depending on the embodiment).

Figure 11:
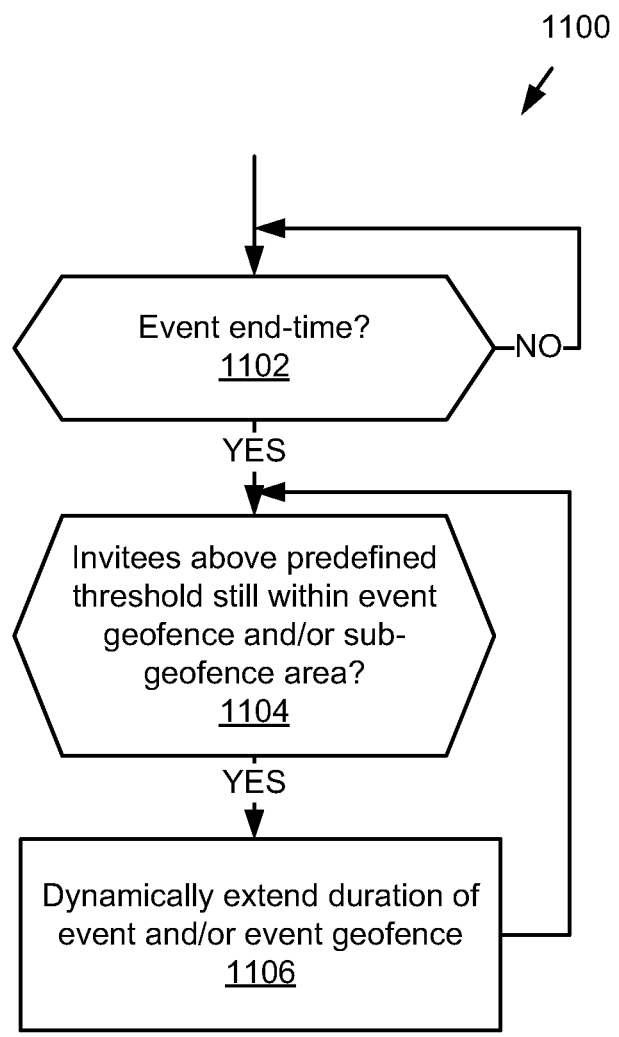
FIG. 11 is a flow chart of an example method for dynamically extending duration of the event.

FIG. 11 is a flow chart of an example method 1100 for dynamically extending duration of the event. In block 1102, the method 1100 determines whether an event end-time has been reached. If so, the method 1100 proceeds to block 1104 to determine whether the invitees above a predefined threshold are still located within the area of the event geofence and/or sub-geofence. If so, the method 1100 proceeds to block 1106 to dynamically extend the duration of the event based. In some embodiments, the event is extended for a predetermined amount of time (e.g., 30 min.) and the method 1100 is re-executed.

In some embodiments, as with various other operations discussed herein, the operations of example method 1100 may be performed by the events planning application 128 in cooperation with the other components of the social platform 120, such as the geofencing engine 124 and the social network application 122, although other variations are possible where other components, such as the social network application 122, perform these operations independently or cooperation with other components.

Various example embodiments for exchanging information between users have been described. In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services.

To ease description, some elements herein may referred to using the labels first, second, third, etc. These labels are intended to help to distinguish the elements but do not necessarily imply any particular order or ranking unless indicated otherwise.

Reference in the specification to "one embodiment," "an embodiment", "some embodiments," or the like, means that a particular feature, structure or characteristic described in connection with the embodiment is included in at least one embodiment of the disclosure. The appearances of the phrase "in one embodiment," "in some embodiments," or the like, in various places in the specification are not necessarily all referring to the same embodiment(s).

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps/blocks. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the subject matter set forth in the following claims.

What is claimed is:

1. A computer-implemented method comprising:
   determining, using one or more computing devices, an event definition describing an event including a location of the event, a first duration of the event, a group of one or more user-specified exemption requirements specific to the event, and invitees to the event;
   generating, using the one or more computing devices, an event geofence associated with the location of the event, the event geofence persisting for a second duration corresponding to the first duration of the event;
   determining, using the one or more computing devices, whether a first invitee is within an area of the event geofence or meets an exemption requirement from the group of one or more user-specified exemption requirements specific to the event, wherein content is shared when the first invitee is within the area of the event geofence or meets the exemption requirement, and wherein the first invitee is one of the invitees to the event included in the event definition; and
   responsive to determining that the first invitee meets a first exemption requirement from the group of one or more user-specified exemption requirements specific to the event, wherein the first exemption requirement includes a client device associated with the first invitee being en route to the event or the first invitee opting to attend the event virtually, sharing, using the one or more computing devices, the content with the first invitee.

2. The method of claim 1, wherein determining the event definition includes receiving the event definition from a client device of an event stakeholder, and generating the event geofence includes initializing the event geofence to persist for the second duration corresponding to the first duration of the event.

3. The method of claim 1, further comprising:
   receiving, using the one or more computing devices, a request from the first invitee included in the event definition that has not yet arrived to the event;
   determining, using the one or more computing devices, that the client device associate with the first invitee is en route to the area of the event geofence, wherein the first exemption requirement includes the client device associated with the first invitee being en route to the event; and
   terminating the sharing of the content with the first invitee responsive to the client device associated with the first invitee, having been determined to be en route to the event, failing to enter the area of the event geofence within a specified timeframe.

4. The method of claim 1, further comprising:
   dynamically creating, using the one or more computing devices, a sub-geofence distinct from the event geofence for a sub-group of the invitees in attendance at the event and that have moved to a location outside the area of the event geofence.

5. The method of claim 4, further comprising:
   receiving, using the one or more computing devices, a content share request from an invitee included in the event definition;
   determining, using the one or more computing devices, that a client device of the requesting invitee is within an area of the sub-geofence created from the event geofence;

determining, using the one or more computing devices, an access level for the content share request; and providing, using the one or more computing devices, access to the requesting invitee to share content with other invitees associated with the sub-geofence or the event geofence based on the access level.

6. The method of claim 4, further comprising:

converting, using the one or more computing devices, the sub-geofence into a new event that includes the sub-group of the invitees in attendance at the event and within the sub-geofence as attendees of the new event.

7. The method of claim 4, further comprising:

subsequent to determining that the sub-group of the invitees is located within the event geofence, providing, using the one or more computing devices, access, to the sub-group of the invitees, to share content with other invitees attending the event and located within the area of the event geofence; and dissolving, using the one or more computing devices, the sub-geofence.

8. The method of claim 1, further comprising:

determining, using the one or more computing devices, a group of the invitees associated with the event geofence are migrating to a new location different from the location defined in the event; and dynamically updating, using the one or more computing devices, the area of the event geofence to include the new location.

9. The method of claim 1, further comprising:

determining that one or more of the first duration and second duration has expired; and subsequent to determining that one or more of the first duration and second duration has expired, sharing content with a third invitee that was neither located within the area of the event geofence nor meets the exemption requirement.

10. A computer program product comprising a non-transitory computer-readable medium storing a computer-readable program, wherein the computer-readable program, when executed on one or more computers, causes the one or more computers to perform operations comprising:

determining an event definition describing an event including a location of the event, a first duration of the event, a group of one or more user-specified exemption requirements specific to the event, and invitees to the event;

generating an event geofence associated with the location of the event, the event geofence persisting for a second duration corresponding to the first duration of the event;

determining whether a first invitee is within an area of the event geofence or meets an exemption requirement from the group of one or more user-specified exemption requirements specific to the event, wherein the first invitee is an invitee to the event included in the event definition; and sharing content with the first invitee responsive to determining that the first invitee meets a first exemption requirement from the group of one or more user-specified exemption requirements specific to the event, wherein the first exemption requirement includes a client device associated with the first invitee being en route to the event or the first invitee opting to attend the event virtually.

11. The computer program product of claim 10, wherein determining the event definition includes receiving the event definition from a client device of an event stakeholder, and generating the event geofence includes initializing the event geofence to persist for the second duration corresponding to the first duration of the event.

12. The computer program product of claim 10, wherein the computer-readable program, when executed on the one or more computers, further causes the one or more computers to perform operations of:

receiving a request from the first invitee included in the event definition that has not yet arrived to the event;

determining that the client device of the first invitee is en route to the area of the event geofence, wherein the first exemption requirement includes the client device associated with the first invitee being en route to the event; and terminating the sharing of the content with the first invitee responsive to the client device associated with the first invitee, having been determined to be en route to the event, failing to enter the area of the event geofence within a specified timeframe.

13. The computer program product of claim 10, wherein the computer-readable program, when executed on the one or more computers, further causes the one or more computers to perform operations of:

dynamically creating a sub-geofence distinct from the event geofence for a sub-group of the invitees in attendance at the event and that have moved to a location outside the area of the event geofence.

14. The computer program product of claim 13, wherein the computer-readable program, when executed on the one or more computers, further causes the one or more computers to perform operations of:

receiving a content share request from an invitee included in the event definition;

determining that a client device of the requesting invitee is within an area of the sub-geofence created from the event geofence;

determining an access level for the content share request; and providing access to the requesting invitee to share content with other invitees associated with the sub-geofence or the event geofence based on the access level.

15. The computer program product of claim 10, wherein the computer-readable program, when executed on the one or more computers, further causes the one or more computers to perform operations of:

determining a group of the invitees associated with the event geofence are migrating to a new location different from the location defined in the event; and dynamically updating the area of the event geofence to include the new location.

16. A system comprising:

one or more processors;

one or more memories storing instructions that, when executed by the one or more processors, cause the system to perform operations including:

determining an event definition describing an event including a location of the event, a first duration of the event, a group of one or more user-specified exemption requirements specific to the event, and invitees to the event;

generating an event geofence associated with the location of the event, the event geofence persisting for a second duration corresponding to the first duration of the event;

determining whether a first invitee is within an area of the event geofence or meets an exemption requirement from the group of one or more user-specified exemption requirements specific to the event, wherein the first invitee is one of the invitees to the event included in the event definition; and sharing content with the first invitee responsive to determining that the first invitee meets a first exemption requirement from the group of one or more user-specified exemption requirements specific to the event, wherein the first exemption requirement includes a client device associated with the first invitee being en route to the event or the first invitee opting to attend the event virtually.

17. The system of claim 16, wherein determining the event definition includes receiving the event definition from a client device of an event stakeholder, and generating the event geofence includes initializing the event geofence to persist for the second duration corresponding to the first duration of the event.

18. The system of claim 16, wherein the instructions, when executed by the one or more processors, further cause the system to perform operations including:

receiving a request from the first invitee included in the event definition that has not yet arrived to the event;

determining that the client device associated with the first invitee is en route to the area of the event geofence, wherein the first exemption requirement includes the client device associated with the first invitee being en route to the event; and terminating the sharing of the content with the first invitee responsive to the client device associated with the first invitee, having been determined to be en route to the event, failing to enter the area of the event geofence within a specified timeframe.

19. The system of claim 16, wherein the instructions, when executed by the one or more processors, further cause the system to perform operations including:

dynamically creating a sub-geofence distinct from the event geofence for a sub-group of the invitees in attendance of the event that have moved to a location outside the area of the event geofence.

20. The system of claim 19, wherein the instructions, when executed by the one or more processors, further cause the system to perform operations including:

receiving a content share request from an invitee included in the event definition;

determining that a client device of the requesting invitee is within an area of the sub-geofence created from the event geofence;

determining an access level for the content share request; and providing access to the requesting invitee to share content with other invitees associated with the sub-geofence or the event geofence based on the access level.

21. The system of claim 16, wherein the instructions, when executed by the one or more processors, further cause the system to perform operations including:

determining a group of the invitees associated with the event geofence are migrating to a new location different from the location defined in the event; and dynamically updating the area of the event geofence to include the new location.

* * * * *